(12) United States Patent
Gidney et al.

(10) Patent No.: US 11,909,392 B2
(45) Date of Patent: Feb. 20, 2024

(54) MAGIC STATE FACTORY CONSTRUCTIONS FOR PRODUCING CCZ AND T STATES

(71) Applicant: Google LLC, Mountain View, CA (US)

(72) Inventors: Craig Gidney, Goleta, CA (US); Austin Greig Fowler, Reseda, CA (US)

(73) Assignee: Google LLC, Mountain View, CA (US)

( * ) Notice: Subject to any disclaimer, the term of this patent is extended or adjusted under 35 U.S.C. 154(b) by 368 days.

(21) Appl. No.: 17/296,909

(22) PCT Filed: Nov. 27, 2019

(86) PCT No.: PCT/US2019/063744
§ 371 (c)(1),
(2) Date: May 25, 2021

(87) PCT Pub. No.: WO2020/113095
PCT Pub. Date: Jun. 4, 2020

(65) Prior Publication Data
US 2022/0029625 A1    Jan. 27, 2022

Related U.S. Application Data

(60) Provisional application No. 62/773,066, filed on Nov. 29, 2018.

(51) Int. Cl.
*H03K 19/003*  (2006.01)
*G06N 10/00*   (2022.01)
(Continued)

(52) U.S. Cl.
CPC ............. *H03K 19/003* (2013.01); *G06F 8/20* (2013.01); *G06F 11/004* (2013.01); *G06N 10/00* (2019.01);
(Continued)

(58) Field of Classification Search
CPC .. G06N 99/002; G06N 10/00; G06F 2201/82; G06F 11/004; G06F 8/20; G06F 2111/10;
(Continued)

(56) References Cited

PUBLICATIONS

Paetznick et al , NPL, arXiv: 1304.3709v2 Universal fualt-tolernat quantum computation with only transversal gates and error correction (Year: 2013).*

(Continued)

*Primary Examiner* — Arnold M Kinkead
(74) *Attorney, Agent, or Firm* — Fish & Richardson P.C.

(57) ABSTRACT

Methods, systems, and apparatus for producing CCZ states and T states. In one aspect, a method for distilling a CCZ state includes preparing multiple target qubits, ancilla qubits and stabilizer qubits in a zero state, performing an X gate for each stabilizer qubit on multiple ancilla qubits or multiple ancilla qubits and one of the target qubits using the stabilizer qubit as a control, measuring the stabilizer qubits, performing, on each of the ancilla qubits, a $Z^{1/4}$ gate and a Hadamard gate, measuring each of the ancilla qubits, performing, conditioned on each measured ancilla qubit state, a NOT operation on a selected stabilizer qubit, or a NOT operation on the selected stabilizer qubit and a Z gate on one or more respective target qubits, performing, on each target qubit and conditioned on a measured state of a respective stabilizer qubit, a Z gate on the target qubit, and performing an X gate on each of the target qubits.

20 Claims, 13 Drawing Sheets

(51) Int. Cl.
  *G06F 8/20* (2018.01)
  *H03M 13/00* (2006.01)
  *H03M 13/29* (2006.01)
  *G06F 11/00* (2006.01)
  *H03M 13/03* (2006.01)
  *G06F 111/10* (2020.01)

(52) U.S. Cl.
  CPC ..... *H03M 13/033* (2013.01); *H03M 13/2909* (2013.01); *H03M 13/611* (2013.01); *G06F 2111/10* (2020.01); *G06F 2201/82* (2013.01)

(58) Field of Classification Search
  CPC .......... H03M 13/2909; H03M 13/033; H03M 13/3308; H03M 13/611; H03K 19/003
  USPC .................................................... 326/1, 6, 9
  See application file for complete search history.

(56) References Cited

PUBLICATIONS

Jones, NPL, arXiv:1303.6971v1 Composite Toffoli gate with two-round error detection (Year: 2013).*
Examination report in Australian Appln. No. 2019389094, dated May 17, 2022, 3 pages.
Notice of Allowance in Australian Appln. No. 2019389094, dated Feb. 1, 2023, 3 pages.
Office Action in Australian Appln. No. 2019389094, dated Dec. 20, 2022, 3 pages.
Office Action in Canada Appln. No. 3,121,488, dated Feb. 9, 2023, 3 pages.
Office Action in Canada Appln. No. 3,121,488, dated Jul. 22, 2022, 4 pages.
Eastin et al., "Distilling one-qubit magic states into Toffoli states," Physical Review A, Mar. 2013, 87(3):1-8.
Fowler et al., "Low overhead quantum computation using lattice surgery," Quantum Physics, Cornell University, arXiv preprint arXiv: 1808.06709, Aug. 2018, 15 pages.
Gidney et al., "Efficient magic state factories with a catalyzed CCZ transformation," Quantum, Apr. 2019, 3:1-24.
Jones et al., "Low-overhead constructions for the fault-tolerant Toffoli gate," Physical Review A., Feb. 2013, 87(2):1-5.
Li et al., "A magic state's fidelity can be superior to the operations that created it," New Journal of Physics, Feb. 2015, 17(2): 1-8.
Paetznick et al., "Universal fault-tolerant quantum computation with only transversal gates and error correction," Physical Review Letters, Aug. 2013, 111(9):1-5.
Paterson et al., "Yet another hat game," Combinatorics, Cornell University, arXiv preprint arXiv:1001.3850, Jan. 2010, 13 pages.
PCT International Preliminary Report on Patentability in International Appln. No. PCT/US2019/063744, dated Jun. 10, 2021, 1 page.
PCT International Search Report and Written Opinion in International Appln. No. PCT/US2019/063744, dated Mar. 12, 2021, 25 pages.
Office Action in European Appln. No. 19824129.1, dated Nov. 30, 2023, 10 pages.

* cited by examiner

```
                                 200
                                    ↘

┌─────────────────────────────────────────────────────────────────────┐
│  Prepare register of qubits in zero state, where the register       │
│  includes target qubits, ancilla qubits and stabilizer qubits   202 │
└─────────────────────────────────────────────────────────────────────┘
                                 ↓
┌─────────────────────────────────────────────────────────────────────┐
│  Perform an X gate for each stabilizer qubit on i) multiple ancilla │
│  qubits, or ii) multiple ancilla qubits and one of the target       │
│  qubits using the stabilizer qubit as a control                 204 │
└─────────────────────────────────────────────────────────────────────┘
                                 ↓
┌─────────────────────────────────────────────────────────────────────┐
│  Measure stabilizer qubits to determine respective stabilizer       │
│  qubit states                                                   206 │
└─────────────────────────────────────────────────────────────────────┘
                                 ↓
┌─────────────────────────────────────────────────────────────────────┐
│  Perform a $Z^{1/4}$ gate and a Hadamard gate on each               │
│  ancilla qubit                                                  208 │
└─────────────────────────────────────────────────────────────────────┘
                                 ↓
┌─────────────────────────────────────────────────────────────────────┐
│  Measure ancilla qubits to determine respective ancilla             │
│  qubit states                                                   210 │
└─────────────────────────────────────────────────────────────────────┘
                                 ↓
┌─────────────────────────────────────────────────────────────────────┐
│  Perform, on each ancilla qubit and conditioned on a respective     │
│  ancilla qubit state, i) a NOT operation on a second stabilizer     │
│  qubit, or ii) a NOT operation on the second stabilizer qubit and   │
│  a Z gate on one or more target qubits                          212 │
└─────────────────────────────────────────────────────────────────────┘
                                 ↓
┌─────────────────────────────────────────────────────────────────────┐
│  Perform, on each target qubit and conditioned on a state of a      │
│  respective stabilizer qubit, a Z gate on the target qubit      214 │
└─────────────────────────────────────────────────────────────────────┘
                                 ↓
┌─────────────────────────────────────────────────────────────────────┐
│  Perform X gate on each target qubit to obtain CCZ state        216 │
└─────────────────────────────────────────────────────────────────────┘
```

```
┌─────────────────────────────────────────────────────────────┐
│ Obtain first target qubit, second target qubit and third    │
│ target qubit in a CCZ state                            602  │
└─────────────────────────────────────────────────────────────┘
                              ↓
┌─────────────────────────────────────────────────────────────┐
│ Perform a X^-½ gate on the third target qubit          604  │
└─────────────────────────────────────────────────────────────┘
                              ↓
┌─────────────────────────────────────────────────────────────┐
│ Perform an X gate on the first target qubit and the         │
│ second target qubit using the third target qubit as a       │
│ control                                                606  │
└─────────────────────────────────────────────────────────────┘
                              ↓
┌─────────────────────────────────────────────────────────────┐
│ Perform a Z gate on the first target qubit and the second   │
│ target qubit using the third qubit as a X control     608   │
└─────────────────────────────────────────────────────────────┘
                              ↓
┌─────────────────────────────────────────────────────────────┐
│ Perform a Z^-¼ gate on the third target qubit         610   │
└─────────────────────────────────────────────────────────────┘
                              ↓
┌─────────────────────────────────────────────────────────────┐
│ Perform a Z gate on the first target qubit and the second   │
│ target qubit using the third qubit as a X control to obtain │
│ three T states                                         612  │
└─────────────────────────────────────────────────────────────┘
```

FIG. 6

MAGIC STATE FACTORY CONSTRUCTIONS FOR PRODUCING CCZ AND T STATES

CROSS-REFERENCE TO RELATED APPLICATION

This application is a National Stage Application under 35 U.S.C. § 371 and claims the benefit of International Application No. PCT/US2019/063744, filed Nov. 27, 2019, which claims priority to U.S. Application No. 62/773,066, filed Nov. 29, 2018, the disclosure of which is incorporated herein by reference.

BACKGROUND

This specification relates to quantum computing.

To perform quantum computations, techniques are needed so that a universal set of quantum gates can be implemented fault-tolerantly. Most error correcting codes allow fault-tolerant implementation of gates from the Clifford group—a non-universal set of gates. Fully functional quantum computation can be attained by adding the Toffoli or $\pi/8$ phase gate to the Clifford group. Performing these gates includes preparing high-fidelity magic states which are used to inject a gate into a main computation. These magic states are typically needed in vast quantities, and their preparation requires a significant portion of a device to operate as a dedicated magic state factory.

SUMMARY

This specification describes magic state factory methods and constructions for distilling CCZ states and T states.

One innovative aspect of the subject matter described in this specification can be implemented in a method for distilling a CCZ state, the method including preparing a register of qubits in a zero state, the register comprising a plurality of target qubits, a plurality of ancilla qubits and a plurality of stabilizer qubits; performing, for each stabilizer qubit, an X gate on i) multiple ancilla qubits, or ii) multiple ancilla qubits and one of the target qubits using the stabilizer qubit as a control; measuring the stabilizer qubits to determine respective stabilizer qubit states; performing, on each of the ancilla qubits, a $Z^{\wedge}(1/4)$ quantum gate and a Hadamard quantum gate; measuring each of the ancilla qubits to determine respective ancilla qubit states; performing, conditioned on each determined ancilla qubit state, i) a NOT operation on a selected stabilizer qubit, or ii) a NOT operation on the selected stabilizer qubit and a Z gate on one or more respective target qubits; performing, on each target qubit and conditioned on a determined state of a respective stabilizer qubit, a Z gate on the target qubit; and performing an X gate on each of the target qubits to obtain the CCZ state.

Other implementations of this aspect include corresponding devices, computer systems, apparatus, or computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

For example, a quantum computing device comprising: a register of qubits comprising multiple target qubits, multiple ancilla qubits, and multiple stabilizer qubits each prepared in a respective initial state; a plurality of control lines coupled to the register of qubits; a plurality of control devices coupled to the plurality of control lines; and one or more classical processors may be configured to perform the actions of the methods.

The foregoing and other implementations can each optionally include one or more of the following features, alone or in combination. In some implementations the plurality of target qubits comprises three target qubits, the plurality of ancilla qubits comprises eight ancilla qubits and the plurality of stabilizer qubits comprises four stabilizer qubits.

In some implementations performing, for each stabilizer qubit, an X gate on i) multiple ancilla qubits, or ii) multiple ancilla qubits and one of the target qubits using the stabilizer qubit as a control, and measuring the stabilizer qubits to determine respective stabilizer qubit states comprises performing a sequence of operations from a first set of operations, the first set of operations comprising: performing an X gate on a first target qubit using a first stabilizer qubit as a control; performing an X gate on a first, second, third and fourth ancilla qubit using the first stabilizer qubit as a control; performing an X gate on the first, the second, the third, the fourth, a fifth, a sixth, a seventh and an eighth ancilla qubits using a second stabilizer qubit as a control; performing an X gate on a third target qubit using a third stabilizer qubit as a control; performing an X gate on the first, the second, the fifth and the seventh ancilla qubits using the third stabilizer qubit as a control; performing an X gate on a second target qubit using a fourth stabilizer qubit as a control; performing an X gate on the first, second, fifth and sixth ancilla qubits using the fourth stabilizer qubit as a control; measuring the first stabilizer qubit; measuring the second stabilizer qubit; measuring the third stabilizer qubit; and measuring the fourth stabilizer qubit In some implementations performing, for each ancilla qubit and conditioned on a determined state of the respective ancilla qubit, i) a NOT operation on the second stabilizer qubit, or ii) a NOT operation on the second stabilizer qubit and a Z gate on one or more target qubits comprises performing a sequence of operations from a second set of operations, the second set of operations comprising: performing, conditioned on the state of the first ancilla qubit, a Z gate on each of the three target qubits and a NOT operation on the second stabilizer qubit; performing, conditioned on the state of the second ancilla qubit, a Z gate on the first and the second target qubits and a NOT operation on the second stabilizer qubit; performing, conditioned on the state of the third ancilla qubit, a Z gate on the first and the third target qubits and a NOT operation on the second stabilizer qubit; performing, conditioned on the state of the fourth ancilla qubit, a Z gate on the first target qubit and a NOT operation on the second stabilizer qubit; performing, conditioned on the state of the fifth ancilla qubit, a Z gate on the second and the third target qubits and a NOT operation on the second stabilizer qubit; performing, conditioned on the state of the sixth ancilla qubit, a Z gate on the second target qubit and a NOT operation on the second stabilizer qubit; performing, conditioned on the state of the seventh ancilla qubit, a Z gate on the third target qubit and a NOT operation on the second stabilizer qubit; and performing, conditioned on the state of the eighth ancilla qubit, a NOT operation on the second stabilizer qubit.

In some implementations performing, for each target qubit and conditioned on a determined state of a stabilizer qubit, a Z gate on the target qubit comprises: performing, conditioned on the state of the first stabilizer qubit, a Z gate on the first target qubit; performing, conditioned on the state of the third stabilizer qubit, a Z gate on the third target qubit; and performing, conditioned on the state of the fourth stabilizer qubit, a Z gate on the second target qubit.

In some implementations performing, for each stabilizer qubit, an X gate on i) multiple ancilla qubits, or ii) multiple ancilla qubits and one of the target qubits using the stabilizer qubit as a control comprises using the stabilizer qubit as an X axis control by applying a Hadamard gate to the stabilizer qubit before and after the stabilizer qubit is used as a control.

In some implementations measuring the stabilizer qubits comprises performing Pauli product measurements on the stabilizer qubits.

In some implementations, the method further comprises performing a post selection operation, comprising: determining whether an error occurred or not using a parity computation; and in response to determining that an error occurred, discarding the obtained CCZ state.

In some implementations the parity computation is performed on the selected stabilizer qubit.

In some implementations using a post selection operation comprises implementing classical control software.

In some implementations the method is implemented using lattice surgery techniques.

In some implementations the method is implemented to distill a first CCZ state and the method further comprises concurrently distilling a second CCZ state by partially overlapping executions of operations corresponding to the distillation of the first CCZ state and the distillation of the second CCZ state.

In some implementations executions of operations corresponding to distillation of the first CCZ state and distillation of the second CCZ state are reordered prior to the overlapping.

In some implementations the method further comprises providing the CCZ state for use in subsequent computations.

Another innovative aspect of the subject matter described in this specification can be implemented in a method for transforming a CCZ state into three output T states, the method including obtaining i) three target qubits prepared in a CCZ state, ii) a first ancilla qubit in a T state, iii) a multiple additional ancilla qubits prepared in a zero state, and iv) multiple stabilizer qubits prepared in a zero state; performing an X gate on a target qubit and an additional ancilla qubit using a first stabilizer qubit as a control and measuring the first stabilizer qubit to determine a state of the first stabilizer qubit; performing an X gate on multiple target qubits and an additional ancilla qubit using a second stabilizer qubit as a control and measuring the second stabilizer qubit to determine a state of the second stabilizer qubit; performing a $X^{1/2}$ gate on an additional ancilla qubit; performing a Z gate on multiple target qubits and the first ancilla qubit using a third stabilizer qubit as a control; performing a Hadamard gate on the first ancilla qubit and measuring the first ancilla qubit, an additional ancilla qubit and a third stabilizer qubit to determine respective qubit states; performing a $X^{1/2}$ gate on an additional ancilla qubit; performing a Z gate on a target qubit and an additional ancilla qubit using a fourth stabilizer qubit as a control; performing a Hadamard gate on an additional ancilla qubit and measuring the additional ancilla qubit and the fourth stabilizer qubit to determine respective qubit states; performing a NOT operation on a stabilizer qubit using an additional ancilla qubit as a control, and two NOT operations on the additional ancilla qubit and the stabilizer qubit using a different stabilizer qubit as a control; performing a Z gate on multiple target qubits and an additional ancilla qubit using two stabilizer qubits as a control; performing a Hadamard gate on an additional ancilla qubit and measuring the additional ancilla qubit and a stabilizer qubit to determine respective qubit states; and performing multiple classically controlled Pauli operators on the three target qubits conditioned on the determined states of the ancilla qubits.

Other implementations of this aspect include corresponding devices, computer systems, apparatus, or computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. For example, a quantum computing device comprising: a register of qubits comprising multiple target qubits, multiple ancilla qubits, and multiple stabilizer qubits each prepared in a respective initial state; a plurality of control lines coupled to the register of qubits; a plurality of control devices coupled to the plurality of control lines; and one or more classical processors may be configured to perform the actions of the methods.

The foregoing and other implementations can each optionally include one or more of the following features, alone or in combination. In some implementations the three target qubits comprise a first, second and third target qubit, the multiple additional ancilla qubits comprise a second, third and fourth ancilla qubit, and the multiple stabilizer qubits comprise a first, second, third, fourth and fifth stabilizer qubit.

In some implementations performing an X gate on a target qubit and an additional ancilla qubit using a first stabilizer qubit as a control comprises: performing an X gate on the third target qubit using the first stabilizer qubit as a control; and performing an X gate on a third ancilla qubit using the first stabilizer qubit as a control.

In some implementations performing a $X^{1/2}$ gate on an additional ancilla qubit comprises performing a $X^{1/2}$ gate on the third ancilla qubit.

In some implementations performing an X gate on multiple target qubits and an additional ancilla qubit using a second stabilizer qubit as a control comprises: performing an X gate on a first and a second target qubit using the second stabilizer qubit as a control; and performing an X gate on a fourth ancilla qubit using the second stabilizer qubit as a control.

In some implementations performing a Z gate on multiple target qubits and an ancilla qubit using a third stabilizer qubit as a control comprises performing a Z gate on multiple target qubits and the first ancilla qubit using the third stabilizer qubit as a control.

In some implementations performing a Z gate on multiple target qubits and the first ancilla qubit using the third stabilizer qubit as an X axis control comprises: performing a Z gate on each of the three target qubits using the third stabilizer qubit as a control; and performing a Z gate on the first ancilla qubit using the third stabilizer qubit as a control.

In some implementations measuring the first ancilla qubit, an additional ancilla qubit and a stabilizer qubit to determine respective qubit states comprises measuring the first ancilla qubit, the third ancilla qubit and the third stabilizer qubit to determine respective qubit states.

In some implementations performing a $X^{1/2}$ gate on an additional ancilla qubit comprises performing a $X^{1/2}$ gate on the second ancilla qubit.

In some implementations performing a Z gate on a target qubit and an additional ancilla qubit using a fourth stabilizer qubit as a control comprises: performing a Z gate on the third target qubit using the fourth stabilizer qubit as a control; and performing a Z gate on the fourth ancilla qubit using the fourth stabilizer qubit as a control.

In some implementations performing a Hadamard gate on an additional ancilla qubit and measuring an additional ancilla qubit comprises: performing a Hadamard gate on the fourth ancilla qubit; and measuring the fourth ancilla qubit and the fourth stabilizer qubit.

In some implementations performing a NOT operation on a stabilizer qubit using an additional ancilla qubit as a control and two NOT operations on the additional ancilla qubit and the stabilizer qubit using a different stabilizer qubit as a control comprises: performing a NOT operation on the third stabilizer qubit using the third ancilla qubit as a control; performing a NOT operation on the third ancilla qubit using the first stabilizer qubit as a control; and performing a NOT operation on the third stabilizer qubit using the first stabilizer qubit as a control.

In some implementations performing a Z gate on multiple target qubits and an additional ancilla qubit using two stabilizer qubits as a control comprises performing a Z gate on each of the three target qubits and the second ancilla qubit using the third and fifth stabilizer qubits as a control.

In some implementations performing a Hadamard gate on an additional ancilla qubit comprises performing a Hadamard gate on the second ancilla qubit.

In some implementations measuring an additional ancilla qubit and a stabilizer qubit comprises measuring the second ancilla qubit and the fifth stabilizer qubit.

In some implementations performing multiple classically controlled Pauli operators on the three target qubits conditioned on the determined states of the ancilla qubits reduces decoherence.

In some implementations performing multiple classically controlled Pauli operators on the three target qubits conditioned on the determined states of the ancilla qubits comprises: performing Z gates on one or more of the three target qubits using at least one of i) one or more stabilizer qubits and ii) one or more ancilla qubits as a control; performing X gates on one or more of the three target qubits using a stabilizer qubit or ancilla qubit as a control; and performing a X gate on a target qubit.

In some implementations performing Z gates on the target qubits using at least one of i) one or more stabilizer qubits and ii) one or more ancilla qubits as a control comprises performing a sequence of operations from a third set of operations, the third set of operations comprising: performing a Z gate on the first, second and third target qubits using the third and fifth stabilizer qubits as a control; performing a Z gate on the first, second and third target qubits using the third ancilla qubit and third stabilizer qubits as a control; performing a Z gate on the first, second and third target qubits using the second ancilla and third stabilizer qubits as a control; performing a Z gate on the third target qubit using the second stabilizer qubit as a control; performing a Z gate on the third target qubit using the fourth ancilla qubit as a control; performing a Z gate on the first, second and third target qubits using the first ancilla qubit as a control.

In some implementations performing X gates on one or more of the three target qubits using a stabilizer qubit or ancilla qubit as a control comprises: performing a X gate on the first and second target qubit using the fourth stabilizer qubit as a control; and performing a X gate on the first, second and third target qubit using the third ancilla qubit as a control.

In some implementations performing a X gate on a target qubit comprises performing a X gate on the third target qubit.

In some implementations using a stabilizer qubit as a control comprises using the stabilizer as an X axis control by applying a Hadamard gate to the qubit before and after the qubit is used as a control.

In some implementations the obtained first ancilla qubit in a T state comprises a catalyst T state output from a previous transformation of a CCZ state into three T states.

In some implementations the method further comprises providing two of the three output T states for use in subsequent computations.

In some implementations the method further comprises determining whether a third output T state has accumulated an amount of error higher than a predetermined acceptable threshold; in response to determining that the third output T state has accumulated an amount of error that is lower than the predetermined acceptable threshold, providing the third output T state as a catalyst T state for a subsequent transformation of a CCZ state; in response to determining that the third output T state has accumulated an amount of error that is higher than or equal to the predetermined acceptable threshold providing a stored T state for a subsequent transformation of a CCZ state.

In some implementations the obtained CCZ state is distilled using the above described method for distilling a CCZ state.

In some implementations the three output T states are less noisy than input T states.

In some implementations different groups of operations are performed in parallel.

Another innovative aspect of the subject matter described in this specification can be implemented in a method for transforming a CCZ state into three T states, the method including obtaining a first target qubit, a second target qubit and a third target qubit in a CCZ state; performing a $X^{-1/2}$ gate on the third target qubit; performing an X gate on the first target qubit and the second target qubit using the third target qubit as a control; performing a Z gate on the first target qubit and the second target qubit using the third qubit as a X axis control; performing a $Z^{-1/4}$ gate on the third target qubit; and performing a Z gate on the first target qubit and the second target qubit using the third qubit as a X axis control to obtain the three T states. The method can further include providing one of the obtained three T states as a catalyst for a subsequent transformation of a CCZ state into three T states.

Other implementations of this aspect include corresponding devices, computer systems, apparatus, or computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. For example, a quantum computing device comprising: a register of qubits comprising multiple target qubits, multiple ancilla qubits, and multiple stabilizer qubits each prepared in a respective initial state; a plurality of control lines coupled to the register of qubits; a plurality of control devices coupled to the plurality of control lines; and one or more classical processors may be configured to perform the actions of the methods.

The disclosed subject matter can be implemented in particular ways so as to realize one or more of the following advantages.

In fault-tolerant quantum computation based on the surface code—a likely component of future error corrected quantum computers due to the surface code's comparatively high threshold and planar connectivity requirements—the cost of a quantum algorithm can be well approximated by the number of non-Clifford operations included in the algorithm. This is because non-Clifford operations are performed via magic state distillation, and the cost of state distillation is high. For example, the spacetime volume (qubit-seconds) of some existing T state factories is two orders of magnitude larger than the volume of a CNOT operation between adjacent qubits. The non-Clifford operation count will likely be particularly significant for the earliest error corrected quantum computers, which may not have enough space to distill magic states in parallel.

The presently described method and factory construction for producing CCZ states (herein referred to as a CCZ state factory) has a footprint of 12d×6d, where d represents surface code distance, produces one CCZ state every 5.5d surface code cycles, and can produce $10^{13}$ states before an error occurs (on average, assuming a physical gate error rate of $10^{-3}$). Compared to using known T state factories, e.g., 12d×8d×6.5d T state factories, the presently described CCZ state factory can quintuple the speed of algorithms that are dominated by the cost of applying Toffoli gates, such as some quantum chemistry algorithms. Furthermore, reducing the footprint of the method and factory construction for producing CCZ states can make them more suited for implementation on early quantum computers with limited space.

The presently described method and factory construction for producing T states (herein referred to as a T state factory) uses a CCZ state, e.g., as output by the presently described CCZ state factory, and a catalyst T state to exactly transform a single CCZ state into two T states. The T state factory has a footprint that is 25% smaller than other known T factories, and outputs T states twice as quickly. The presently described CCZ state factory and T state factory can be combined to produce an efficient T state factory.

A generalization of a catalysis circuit to arbitrary phase angles is also described. The generalization can be used to produce √T states at an order of magnitude more efficiently than previous techniques—for example, two √T states can be produced using 5 T states.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process for distilling a CCZ state.

FIG. 6 is a flowchart of a first example process for transforming a CCZ state into three T states.

DETAILED DESCRIPTION

This specification describes new magic state factory constructions and state distillation techniques for producing T states $$|T\rangle = \frac{1}{\sqrt{2}}(|0\rangle + e^{\frac{i\pi}{4}}|1\rangle)$$

and CCZ states (defined as the output of a CCZ gate applied to an input state $|+++0\rangle$) with improved footprint and space-time volume.

Example Hardware

Figure 1:
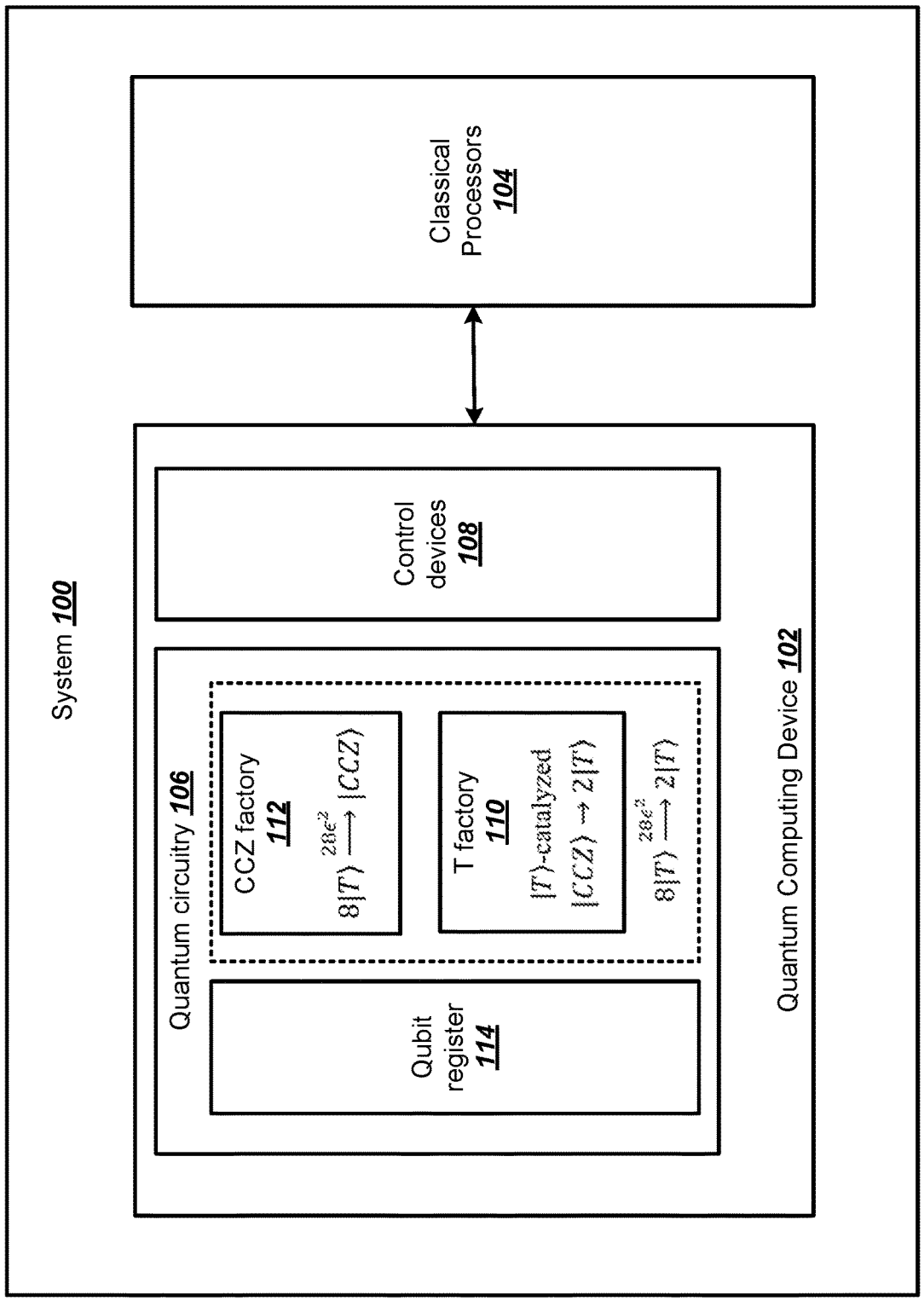
FIG. 1 shows an example quantum computing system.

FIG. 1 shows an example quantum computing system 100. The system 100 is an example of a system implemented as quantum and/or classical computer programs on one or more quantum computing devices and/or classical computers in one or more locations, in which the systems, components, and techniques described below can be implemented.

The system 100 includes a quantum computing device 102 in data communication with one or more classical processors 104. For convenience, the quantum computing device 102 and classical processors 104 are illustrated as separate entities, however in some implementations the one or more classical processors may be included in quantum computing device 102.

The quantum computing device 102 includes components for performing quantum computation. For example, the quantum computing device 102 includes at least quantum circuitry 106 and control devices 108.

The quantum circuitry 106 includes components for performing quantum computations, e.g., components for implementing the various quantum circuits and operations described in this specification. For example, the quantum circuitry may include a quantum system that includes one or more multi-level quantum subsystems, e.g., a register of qubits 114. The qubits are physical qubits that may be used to perform algorithmic operations or quantum computations. The specific realization of the one or more qubits and their interactions may depend on a variety of factors including the type of quantum computations that the quantum computing device 102 is performing. For example, the qubits may include qubits that are realized via atomic, molecular or solid-state quantum systems. In other examples the qubits may include, but are not limited to, superconducting qubits, e.g., Gmon or Xmon qubits, or semi-conducting qubits. In some cases it may be convenient to include one or more resonators attached to one or more superconducting qubits. In other cases ion traps, photonic devices or superconducting cavities (with which states may be prepared without requiring qubits) may be used. Further examples of realizations of multi-level quantum subsystems include fluxmon qubits, silicon quantum dots or phosphorus impurity qubits.

Quantum circuits comprising different quantum logic operations, e.g., the single qubit gates, two qubit gates, and three qubit gates described in this specification, may be constructed using the quantum circuitry 106. Constructed quantum circuits can be operated/implemented using the control devices 108.

The type of control devices 108 included in the quantum system depend on the type of qubits included in the quantum computing device. For example, in some cases the multiple qubits can be frequency tunable. That is, each qubit may have associated operating frequencies that can be adjusted using one or more control devices. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. In these examples the control devices 108 may include devices that control the frequencies of qubits included in the quantum circuitry 106, an excitation pulse generator and control lines that couple the qubits to the excitation pulse generator. The control devices may then cause the frequency of each qubit to be adjusted towards or away from a quantum gate frequency of an excitation pulse on a corresponding control driveline.

The control devices 108 may further include measurement devices, e.g., readout resonators. Measurement results obtained via measurement devices may be provided to the classical processors 104 for processing and analyzing. Measurement devices perform physical measurements on properties of the qubits, either directly or indirectly, from which the state(s) of the qubits can be inferred.

The quantum circuitry 106 can further include one or more magic state factories, e.g., CCZ state factory 112 and T state factory 110. The CCZ state factory 112 generates CCZ states that may be consumed by the quantum circuitry 106 when performing quantum computations. For example, the CCZ state factory 112 may be a $$8|T\rangle \xrightarrow{28\epsilon^2} |CCZ\rangle$$

factory that generates CCZ states according to the techniques described below with reference to FIGS. 2-5. (In this specification factories are referred to using the notation $$|In\rangle \xrightarrow{f(\epsilon)} |Out\rangle.$$

The left hand side $|In\rangle$ represents the state input into the factory, the right hand side $|Out\rangle$ represents the state output from the factory, and the function $f(\epsilon)$ above the arrow indicates an amount of error suppression up to leading terms, i.e. $f(\epsilon)$ is shorthand for the true suppression $f(\epsilon)+O(\epsilon f(\epsilon)))$. For example, the T state distillation based on the known 15-qubit Reed-Muller code is referred to as the $$15|T\rangle \xrightarrow{35\epsilon^3} |T\rangle$$

factory.)

The T state factory 110 generates T states that may be consumed by the quantum circuitry 106 when performing quantum computations. For example, the T state factory 110 may be a $|T\rangle$-catalyzed $|CCZ\rangle \rightarrow 2|T\rangle$ factory that generates T states according to the techniques described below with reference to FIGS. 6-10.

The CCZ state factory 112 and T state factory 110 can also be combined to produce a $$8|T\rangle \xrightarrow{28\epsilon^2} 2|T\rangle$$

factory that generates T states according to the techniques described below with reference to FIGS. 2-13.

Operating the Hardware: Example Methods Performed by the $$8|T\rangle \xrightarrow{28\epsilon^2} |CCZ\rangle$$

Factory

FIG. 2 is a flowchart of an example process for distilling a CCZ state. For convenience, the process 200 will be described as being performed by a system of one or more classical and quantum computing devices located in one or more locations. For example, a quantum computation system, e.g., the system 100 of FIG. 1, appropriately programmed in accordance with this specification, can perform the process 200. In addition, for convenience the operations described below are described with reference to an ordered list of steps, however the order of some of the operations can change and different groups of operations can be performed in parallel.

The system prepares a register of qubits in a zero state (step 202). In other words, the system prepares each qubit in the register of qubits in a zero state. The register of qubits includes multiple target qubits, multiple ancilla qubits, and multiple stabilizer qubits. The target qubits are qubits that will encode the distilled CCZ state. The multiple ancilla qubits and stabilizer qubits are auxiliary qubits (in this specification the term "stabilizer qubits" is used to distinguish between different groups of qubits in the register of qubits, and describes a second multiple of ancilla qubits). An example register of qubits is illustrated and described below with reference to FIG. 3.

For each stabilizer qubit, the system performs an X gate on i) multiple ancilla qubits, or ii) multiple ancilla qubits and one of the target qubits, using the stabilizer qubit as a control (step 204). In some implementations the stabilizer qubit can be used as an X axis control by applying a Hadamard gate to the stabilizer qubit before and after the stabilizer qubit is used as a control.

The system measures the stabilizer qubits to determine respective stabilizer qubit states (step 206). For example, the system can perform respective Pauli product measurements on the stabilizer qubits to determine respective stabilizer qubit states. In some implementations, whenever an X axis control directly precedes a measurement operation, the measurement operation may be a Pauli product measurement.

The system performs a $Z^{1/4}$ quantum gate followed by a Hadamard quantum gate on each of the ancilla qubits (step 208).

The system measures each of the ancilla qubits to determine respective ancilla qubit states (step 210).

The system performs, conditioned on each determined ancilla qubit state, i) a NOT operation on a selected stabilizer qubit, or ii) a NOT operation on the selected stabilizer qubit and a Z gate on one or more respective target qubits (step 212).

The system performs, on each target qubit and conditioned on a determined state of a respective stabilizer qubit, a Z gate on the target qubit (step 214).

The system performs an X gate on each of the target qubits to obtain the CCZ state (step 216). The system can provide the obtained CCZ state for use in subsequent computations, e.g., as input to example process 800.

In some implementations the system may further perform a classical post selection operation implemented by classical control software to determine whether to keep or discard the obtained CCZ state. For example, the system may determine whether an error occurred or not using a parity computation performed on the selected stabilizer qubit. If an error occurred, the system may discard the obtained CCZ state. If an error did not occur, the system may keep the obtained CCZ state, e.g., provide the CCZ state for use in subsequent computations as described above.

In some implementations the system may perform the example process 200 twice to distill a first CCZ state and a second CCZ state. In these implementations, the system can perform the two process concurrently and partially overlap executions of operations corresponding to the distillation of the first CCZ state and the distillation of the second CCZ state (which may require some reordering of the steps of the example process 200 prior to overlapping execution of the operations), as illustrated below with reference to FIG. 5.

Figure 3:
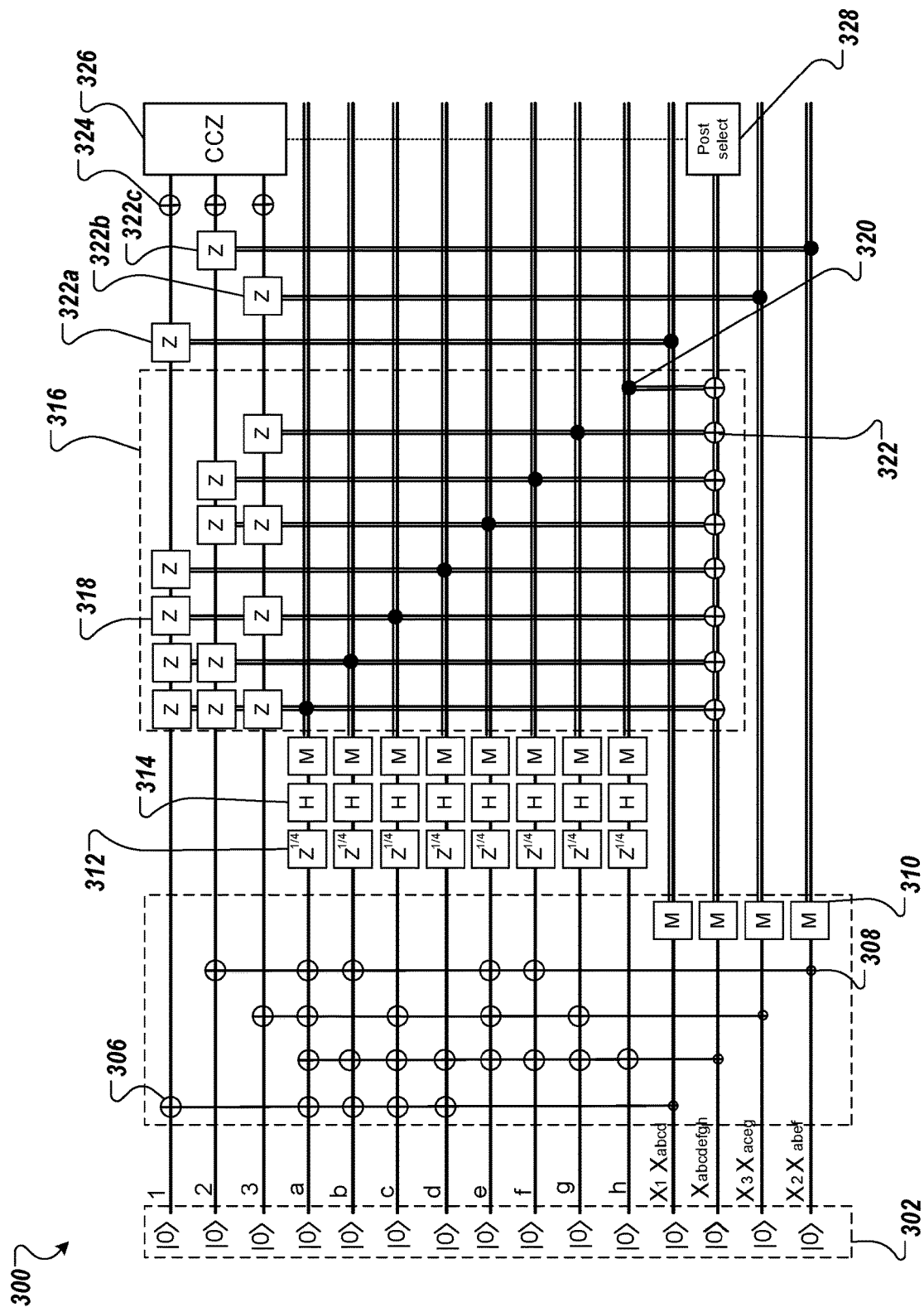
FIG. 3 is a diagram of an example quantum circuit for distilling a CCZ state.

FIG. 3 is a diagram of an example quantum circuit 300 for distilling a CCZ state. The example quantum circuit 300 operates on a register of qubits, represented in FIG. 3 by the horizontal lines. The register of qubits includes three target qubits labelled 1, 2, and 3. The register of qubits further includes eight ancilla qubits labelled a-h and four stabilizer qubits labelled $X_1X_{abcd}$, $X_{abcdefgh}$, $X_3X_{aceg}$, $X_2X_{abef}$. Each qubit in the register of qubits is initialized in a zero state 302, as described above with reference to step 202 of FIG. 2.

The example quantum circuit 300 includes a first set of operations 304. The first set of operations 304 corresponds to steps 204 and 206 of FIG. 2. Operations in the first set of operations 304 include multiple X gates, e.g., X gate 306. Each X gate in the first set of operations 304 is applied to an ancilla qubit or a target qubit and is controlled by a respective stabilizer qubit. In example quantum circuit 300, the controls are X axis controls, e.g., X axis control 308, which represent application of a Hadamard gate to the stabilizer qubit before and after the stabilizer qubit is used as a control.

For example, the X gates can include a first X gate applied to the first target qubit 1, a second X gate applied to the first ancilla qubit a, a third X gate applied to the second ancilla qubit b, a fourth X gate applied to the third ancilla qubit c, and a fifth X gate applied to the fourth ancilla qubit d. Each of the first, second, third, fourth and fifth X gates uses the first stabilizer qubit $X_1X_{abcd}$ as a control. The X gates further include a sixth X gate applied to the first ancilla qubit a, a seventh X gate applied to the second ancilla qubit b, an eighth X gate applied to the third ancilla qubit c, a ninth X gate applied to the fourth ancilla qubit d, a tenth X gate applied to the fifth ancilla qubit e, an eleventh X gate applied to the sixth ancilla qubit f a twelfth X gate applied to the seventh ancilla qubit g, and a thirteenth X gate applied to the eighth ancilla qubit h. Each of the sixth-thirteenth X gates use the second stabilizer qubit $X_{abcdefgh}$ as a control. The X gates further include a fourteenth X gate applied to the third target qubit 3, a fifteenth X gate applied to the first ancilla qubit a, a sixteenth X gate applied to the third ancilla qubit c, a seventeenth X gate applied to the fifth ancilla qubit e, and a eighteenth X gate applied to the seventh ancilla qubit g. Each of the fourteenth-eighteenth X gates use the third stabilizer qubit $X_3X_{aceg}$ as a control. The X gates further include a nineteenth X gate applied to the second target qubit 2, a twentieth X gate applied to the first ancilla qubit a, a twenty-first X gate applied to the second ancilla qubit b, a twenty-second X gate applied to the fifth ancilla qubit e, and a twenty third X gate applied to the sixth ancilla qubit f. Each of the nineteenth-twenty-third X gates use the fourth stabilizer qubit $X_2X_{abef}$ as a control.

The first set of operations 304 further includes four measurement operations, e.g., measurement operation 310. Each measurement operation is applied to a respective stabilizer qubit. In some implementations the measurement operations may be Pauli product measurements.

The example quantum circuit 300 further includes multiple $Z^{1/4}$ gates (T gates), e.g., $Z^{1/4}$ gate 312 and multiple Hadamard gates, e.g., Hadamard gate 314. The multiple $Z^{1/4}$ gates and multiple Hadamard gates are applied to the ancilla qubits a-h. For example, each ancilla qubit a-h is operated on by one $Z^{1/4}$ gate followed by a Hadamard gate. The example quantum circuit 300 further includes multiple measurement operations that are applied to the ancilla qubits a-h after the $Z^{1/4}$ gates and Hadamard gates are applied.

The example quantum circuit 300 further includes a second set of operations 316. The second set of operations 316 corresponds to step 212 of FIG. 2. Operations in the second set of operations 316 include multiple Z gates, e.g., Z gate 318. Each Z gate in the second set of operations 316 is applied to a target qubit conditioned on a measured state of a respective ancilla qubit, as indicated by the solid circles, e.g., circle 320. For example, the Z gates can include a first Z gate applied to the first target qubit 1, a second Z gate applied to the second target qubit 2, and a third Z gate applied to the third target qubit 3. Each of the first, second and third Z gates are performed conditioned on the measured state of the first ancilla qubit a, e.g., are performed if the measured state of the first ancilla qubit was a 1. The Z gates can further include a fourth Z gate applied to the first target qubit 1 and a fifth Z gate applied to the second target qubit 2. The fourth and fifth Z gates are performed conditioned on the measured state of the second ancilla qubit b. The Z gates can further include a sixth Z gate applied to the first target qubit 1 and a seventh Z gate applied to the third target qubit 3. The sixth and seventh Z gates are performed conditioned on the measured state of the third ancilla qubit c. The Z gates further include an eighth Z gate applied to the first target qubit 1. The eighth Z gate is performed conditioned on the measured state of the fourth ancilla qubit d. The Z gates further include a ninth Z gate applied to the second target qubit 2 and a tenth Z gate applied to the third target qubit 3. The ninth and tenth Z gates are performed conditioned on the measured state of the fifth ancilla qubit e. The Z gates further include an eleventh Z gate applied to the second target qubit 2. The eleventh Z gate is performed conditioned on the measured state of the sixth ancilla qubit f. The Z gates further include a twelfth Z gate applied to the third target qubit 3. The twelfth Z gate is performed conditioned on the measured state of the seventh ancilla qubit g.

The second set of operations 316 further includes multiple NOT operations, e.g., NOT operation 322. Each NOT operation is performed on a same stabilizer qubit—the second stabilizer qubit $X_{abcdefgh}$— and is conditioned on a measured state of a respective ancilla qubit. The total number of NOT operations is equal to the total number of ancilla qubits. For example, the NOT operations can include a first NOT operation that is performed on the second stabilizer qubit $X_{abcdefgh}$ conditioned on the measured state of the first ancilla qubit a, second NOT operation that is performed on the second stabilizer qubit $X_{abcdefgh}$ conditioned on the measured state of the second ancilla qubit b, a third NOT operation that is performed on the stabilizer qubit $X_{abcdefgh}$ conditioned on the measured state of the third ancilla qubit c, etc.

The example quantum circuit 300 further includes three Z gates 322a-c that are respectively applied to each of the target qubits 1-3. Each of the three Z gates 322a-c are performed conditioned on a measured state of a respective stabilizer qubit. For example, Z gate 322a is performed on the first target qubit 1 conditioned on a measured state of the first stabilizer qubit $X_1 X_{abcd}$. Z gate 322b is performed on the third target qubit 3 conditioned on a measured state of the third stabilizer qubit $X_3 X_{aceg}$. Z gate 322c is performed on the second target qubit 3 conditioned on a measured state of the fourth stabilizer qubit $X_2 X_{abef}$.

The example quantum circuit 300 further includes three X gates, e.g., X gate 324, that are each applied to a respective target qubit 1-3. The three target qubits 1-3 are then output as a CCZ) state 326.

The example quantum circuit 300 further includes a post-selection operation 328. The post-selection operation 328 is performed by classical control software and is implemented to determine whether an error was detected during the state distillation process. If the post-selection operation indicates the presence of an error and therefore "fails," the output CCZ state 326 can be discarded.

Figure 4:
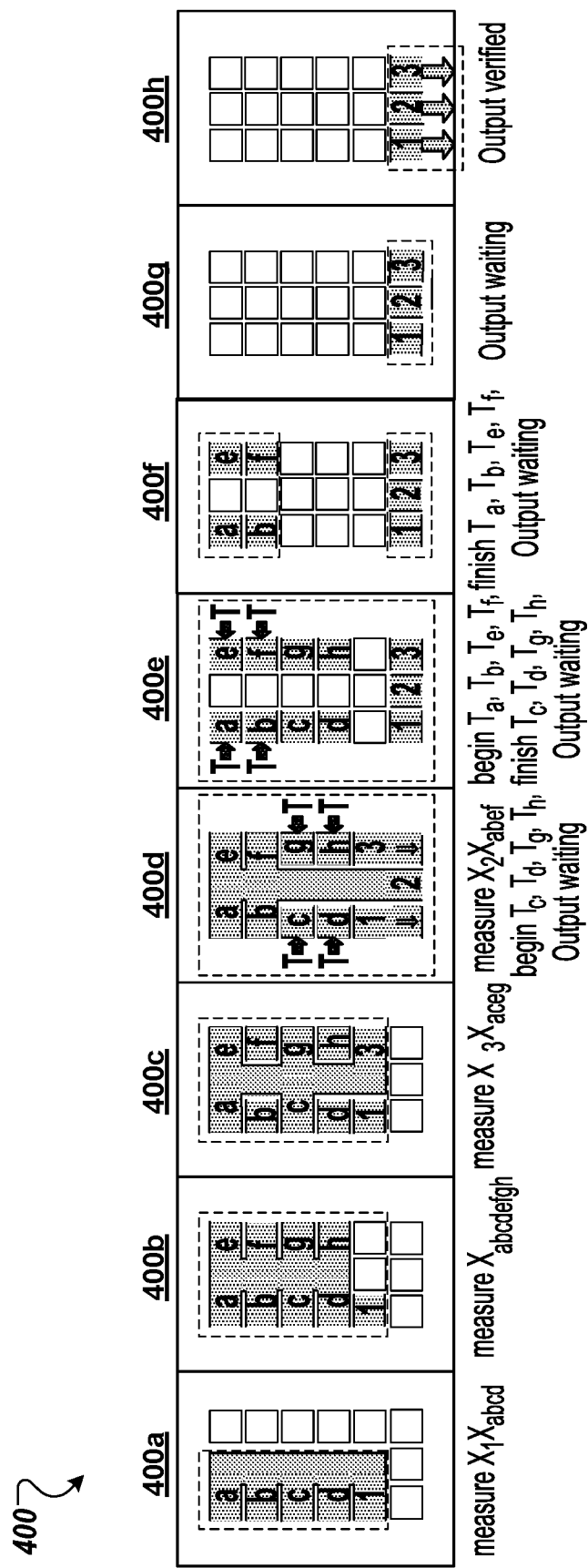
FIG. 4 shows example time slices of lattice surgery activity when applying the example process for distilling a CCZ state to distill one CCZ state.

The operations included in the example quantum circuit 300 can be translated into lattice surgery operations. FIG. 4 shows example time slices 400 of lattice surgery activity during production of a CCZ state using example quantum circuit 300 of FIG. 3. The example time slices 400 correspond to one of many possible translations of example quantum circuit 300 into lattice surgery operations, and are therefore one of many possible time slices (with matching qubit labels and operation labels). In FIG. 4, the squares correspond to different qubits (identified by the label inside the squares) and the shaded rectangles correspond to X stabilizer measurements between sets of qubits. Each arrow labelled T corresponds to a noisy T state entering the system.

Time slice 400a corresponds to the first column of X gates (applied to the first target qubit, first ancilla qubit, second ancilla qubit, third ancilla qubit and fourth ancilla qubit, controlled by the first stabilizer qubit) included in example quantum circuit 300 and the measurement of the first stabilizer qubit.

Time slice 400b corresponds to the second column of X gates (applied to each ancilla qubit a-h and controlled by the second stabilizer qubit) included in the example quantum circuit 300 and the measurement of the second stabilizer qubit. In time slice 400b, no operations are performed on the first target qubit 1.

Time slice 400c corresponds to the third column of X gates (applied to the ancilla qubits a, c, e, g controlled by the third stabilizer qubit) included in the example quantum circuit 300 and the measurement of the third stabilizer qubit. In time slice 400c, no operations are performed on the ancilla qubits b, d, f, h and target qubit 1.

Time slice 400d corresponds to the fourth column of X gates (applied to the second target qubit 2 and ancilla qubits a, b, e, f controlled by the fourth stabilizer qubit) included in the example quantum circuit 300 and the measurement of the fourth stabilizer qubit. Target qubits 1 and 3 are moved, with no other operation performed on them. Time slice 400d also corresponds to the T gates ($Z^{\wedge 1/4}$ gates), Hadamard gates and measurement operations applied to ancilla qubits c, g, d, and h at steps 208 and 210 of FIG. 2.

Time slice 400e corresponds to the remaining T gates ($Z^{\wedge 1/4}$ gates), Hadamard gates and measurement operations applied to ancilla qubits a, b, e, and f at steps 208 and 210 of FIG. 2. Time slice 400e also corresponds to operations performed on target qubits 1 and 3 during the second set of operations 316 of FIG. 3, e.g., the third, fourth, seventh and eighth columns in the second set of operations 316.

Time slice 400f corresponds to the remaining operations included in the second set of operations 316 of FIG. 3, e.g., the first, second, fifth and sixth columns in the second set of operations 316.

Time slice 400g corresponds to the remaining operations in the example quantum circuit 300, e.g., the last four columns of operations in example quantum circuit 300.

Time slice 400h corresponds to outputting the CCZ state after verification.

Figure 5:
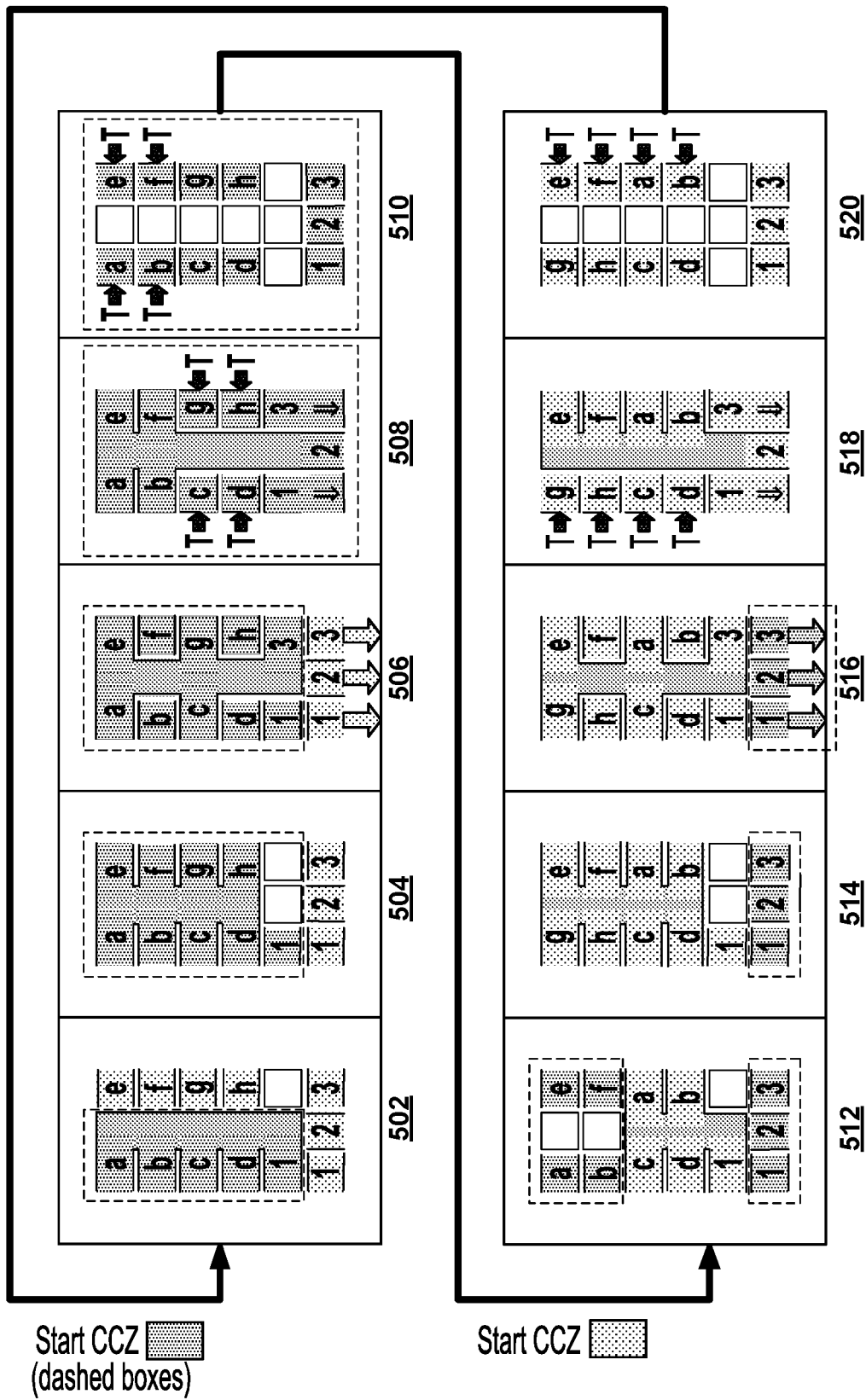
FIG. 5 shows example time slices of lattice surgery activity when applying the example process for distilling a CCZ state to distill two CCZ states.

FIG. 5 shows example time slices of lattice surgery activity during production of |CCZ⟩ states using the $$8|T\rangle \xrightarrow{28\epsilon^2} |CCZ\rangle$$

factory and corresponds to two interleaved translations of the example quantum circuit 300 to increase utilization.

Time slice 502 corresponds to time slices 400f and 400a of FIG. 4. That is, a first process for distilling a CCZ state is at time slice 400f when the second process for distilling a CCZ state begins and is at time slice 400a. Time slice 504 corresponds to times slices 400g and 400b of FIG. 4. Time slice 506 corresponds to time slices 400h and 400c of FIG. 4. The first process is then complete. Time slice 508 corresponds to time slice 400d of FIG. 4 and time slice 510 corresponds to time slice 400e of FIG. 4. Time slice 512 corresponds to a beginning of a third process which is at time slice 400a and time slice 400f for the second process. Time slice 514 corresponds to time slice 400b and 400g of FIG. 4. Time slice 516 corresponds to 400c and 400h of FIG.

4. The second is then complete. Time slices 518 and 520 correspond to 400d and 400e. The loop can then continue to complete the third process and begin a fourth process.

The presently described process for distilling CCZ states has a naive depth of 4 (stabilizer measurements)+1.5 (T state injections)+1 (X or Y basis measurement, depending on T injection measurements)+2 (detect errors)=8.5. However, the process can be performed in parallel example where executions of operations can be partially overlapped, resulting in an effective depth of 5.5.

The error rate of CCZ states produced using the presently described process can be computed as follows: It can be reasonably assumed that the physical gate error rate is $10^{-3}$, and that post-selected state injection techniques can be used to create $T_0$ states with approximately this probability of error. The known $$15|T\rangle \xrightarrow{35e^3} |T\rangle$$

factory based on the Reed-Muller code can be applied to produce $T_1$ states with chance of error approximately equal to $35(10^{-3})^3 \approx 10^{-7}$. The presently described $$8|T\rangle \xrightarrow{28e^2} |CCZ\rangle$$

factory can then be then applied, resulting in a final error rate of $28(10^{-7})^2 \approx 10^{-13}$. An error rate of $10^{-13}$ is sufficient for running classically intractable algorithms. For example, if it is conservatively assumed that Shor's algorithm performs $2n^3$ Toffoli gates, then the presently described $$8|T\rangle \xrightarrow{28e^2} |CCZ\rangle$$

factory can support factoring numbers with ten thousand bits with a failure rate below 50%.

Operating the Hardware: Example Methods Performed by the $|T\rangle$-Catalyzed $|CCZ\rangle \rightarrow 2|T\rangle$ Factory FIG. 6 is a flowchart of a first example process 600 for transforming a CCZ state into three output T states. For convenience, the process 600 will be described as being performed by a system of one or more classical and quantum computing devices located in one or more locations. For example, a quantum computation system, e.g., the system 100 of FIG. 1, appropriately programmed in accordance with this specification, can perform the process 600. In addition, for convenience the operations described below are described with reference to an ordered list of steps, however the order of some of the operations can change and different groups of operations can be performed in parallel.

The system obtains a first target qubit, a second target qubit and a third target qubit in a CCZ state (step 602). In some implementations the CCZ state may be a CCZ state output using example process 200 and example quantum circuit 300.

The system performs a $X^{-1/2}$ gate on the third target qubit (step 604). The system performs an X gate on the first target qubit and the second target qubit using the third target qubit as a control (step 606). The system performs a Z gate on the first target qubit and the second target qubit using the third qubit as a X axis control (step 608). The system performs a $Z^{-1/4}$ gate on the third target qubit (step 610). The system performs a Z gate on the first target qubit and the second target qubit using the third qubit as a X axis control to obtain the three T states (step 612).

Because $|T\rangle$ states can be used to perform T gates, in some implementations one of the obtained three T states can be used as a catalyst for a subsequent transformation of a CCZ state into three T states. For example, the T gate used to transform the $|CCZ\rangle$ into three $|T\rangle$ states can be powered by a $|T\rangle$ state output from a previous iteration of the circuit 600. If a $|T\rangle$ state output from iteration k is fed into iteration k+1, then effectively a circuit that takes a $|CCZ\rangle$ state and outputs two $|T\rangle$ states is obtained. Under this interpretation of the circuit, the third $|T\rangle$ state is an ancillary state that is necessary for the transformation to be possible, but is not consumed by the transformation. Therefore, the third $|T\rangle$ can be referred to as a catalyst. The circuit 600 as a whole is referred is therefore referred to as a $|T\rangle$-catalyzed $8|T\rangle \rightarrow 2|T\rangle$ factory, or "C2T factory" for short.

Although the catalyst $|T\rangle$ state is not consumed by the C2T factory, it can accumulate noise from the incoming $|CCZ\rangle$ states. If a catalyst $|T\rangle$ has cycled through n iterations of the C2T factory, and there is a probability e of each $|CCZ\rangle$ containing an error, then there is an $\Theta(N\epsilon)$ chance that the catalyst has been tainted and is causing the factory to produce bad outputs. However, because every error in the catalyst ultimately traces back to an error in a $|CCZ\rangle$ state, the chance of there being any error grows like $\Theta(N\epsilon)$, instead of $\Theta(N\epsilon^2)$ as would be expected from a naive calculation assuming uncorrelated errors. Distillation protocols usually require inputs with uncorrelated errors, so in some implementations it may be beneficial to include the C2T factory as a last step in a distillation chain. This style of usage means that the correlation between errors is a benefit instead of a cost.

Figure 7:
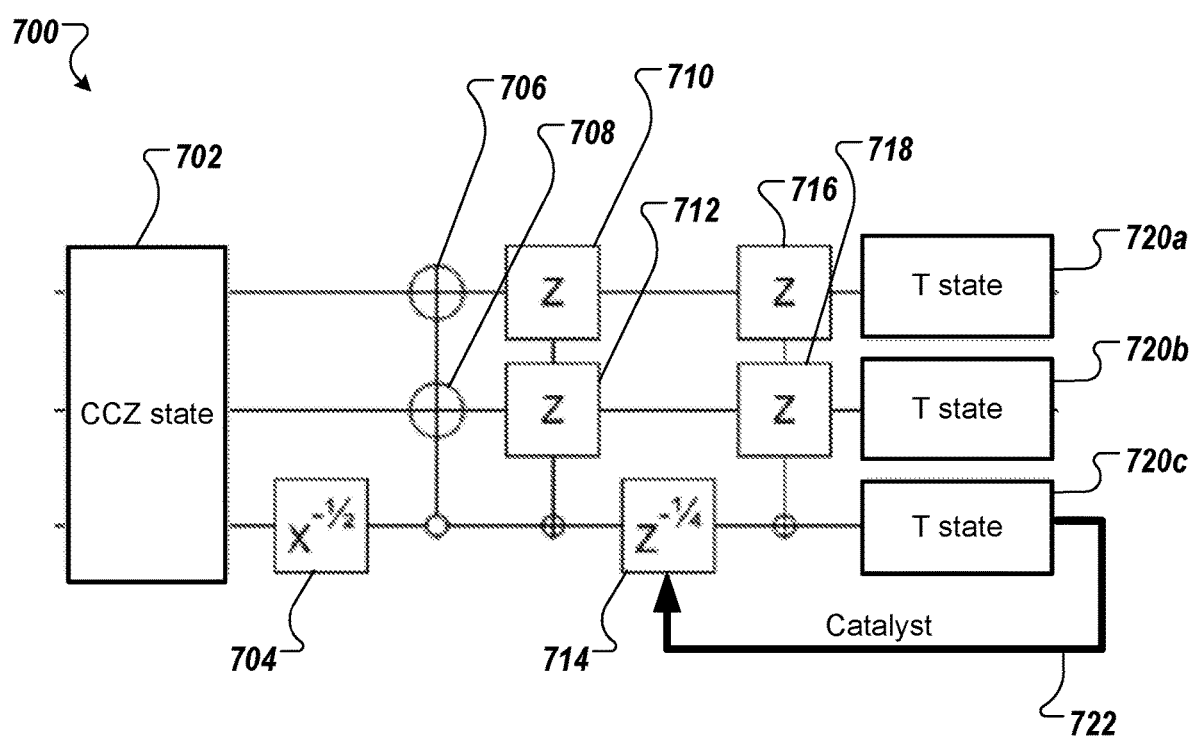
FIG. 7 is a diagram of a first example quantum circuit for generating three T states using a CCZ state.

FIG. 7 is a diagram of a first example quantum circuit 700 for generating three T states using a CCZ state. The example quantum circuit 700 operates on a register of qubits 702 that includes three qubits prepared in a CCZ state. The example quantum circuit 700 includes an $X^{-1/2}$ gate 704 that is applied to the third qubit in the register of qubits 702. The example quantum circuit 700 also includes a first X gate 706 that is applied to the first qubit in the register of qubits 702 and a second X gate 708 that is applied to the second qubit in the register of qubits 702. X gates 706 and 708 are controlled by the third qubit. The example quantum circuit 700 further includes a first Z gate 710 applied to the first qubit and a second Z gate 712 applied to the second qubit. Application of the first Z gate 710 and second Z gate 712 are (X axis) controlled by the third qubit. The example quantum circuit 700 further includes a $Z^{-1/4}$ gate 714 applied to the third qubit. The example quantum circuit 700 further includes a third Z gate 716 applied to the first qubit and a fourth Z gate 718 applied to the second qubit. Application of the third Z gate 716 and fourth Z gate 718 are (X axis) controlled by the third qubit. The example quantum circuit 700 outputs the first qubit, second qubit and third qubit in T states 720a-c.

Application of the $Z^{-1/4}$ gate 714 requires a T state, therefore, in some cases a T state output by a first implementation of the example quantum circuit 700 may be provided as a catalytic input to a second implementation of the example quantum circuit 700, as indicated by arrow 722.

Figure 8:
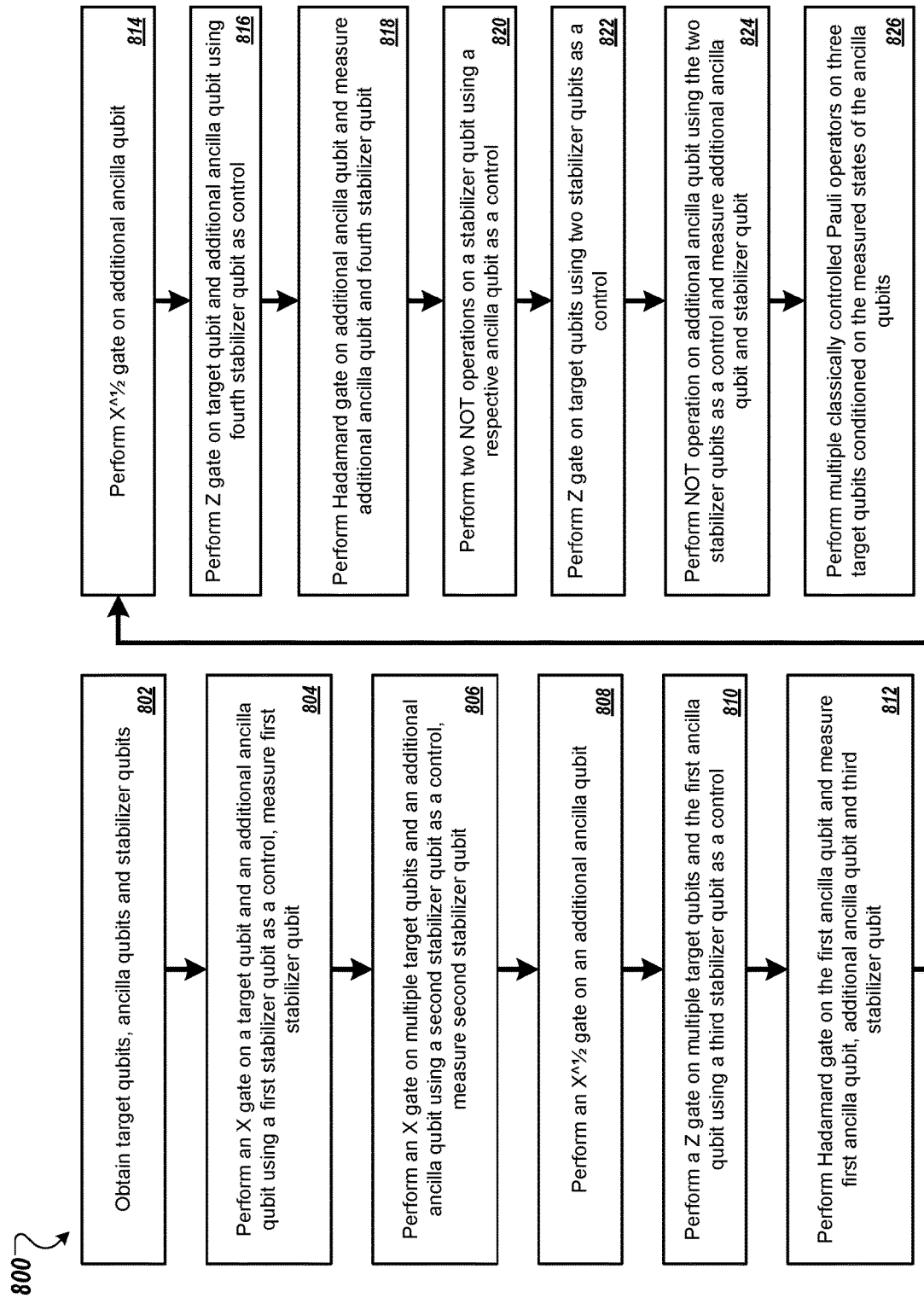
FIG. 8 is a flow diagram of a second example process for generating three T states using a CCZ state.
Figure 9:
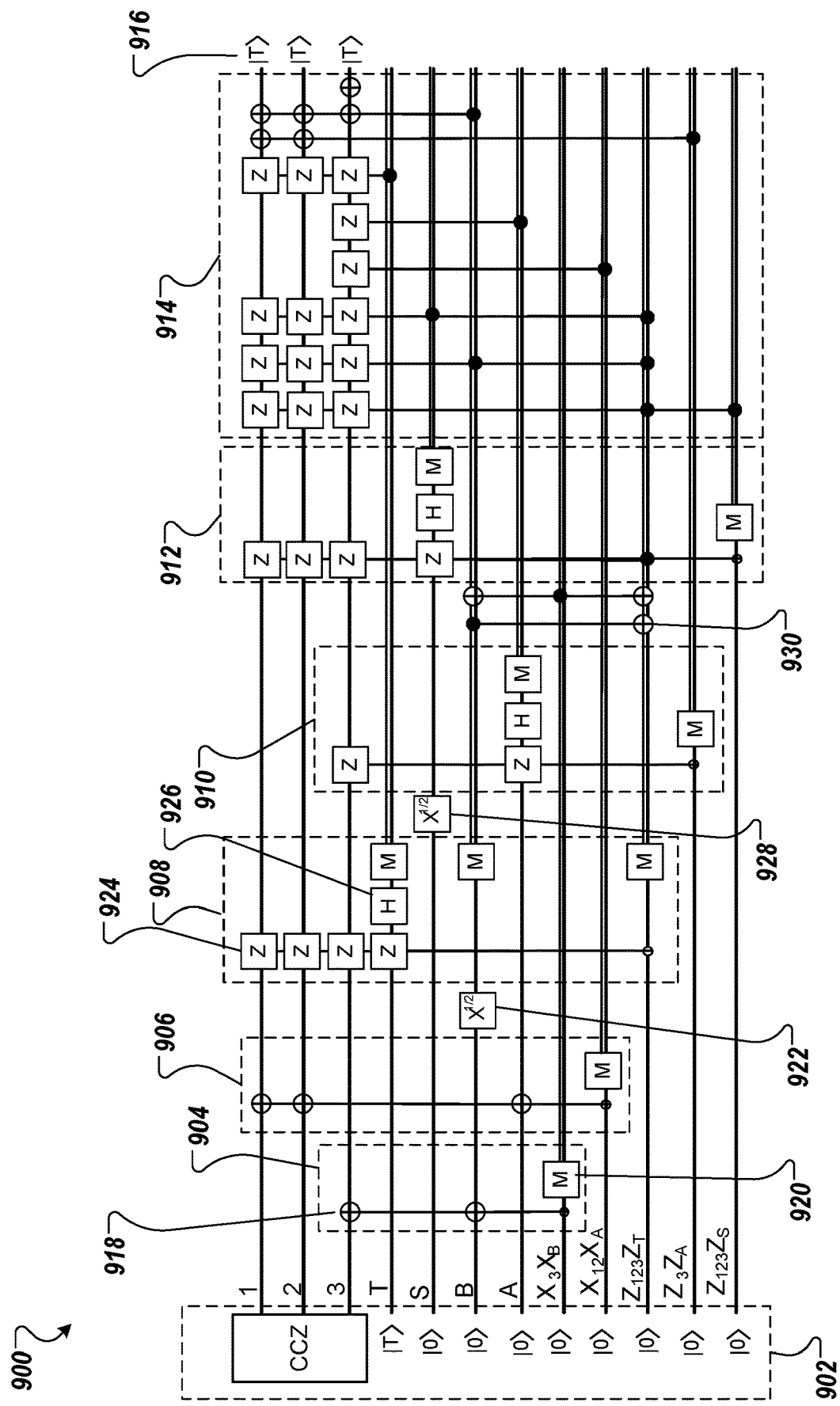
FIG. 9 is a diagram of a second example quantum circuit for generating three T states using a CCZ state.
Figure 10:
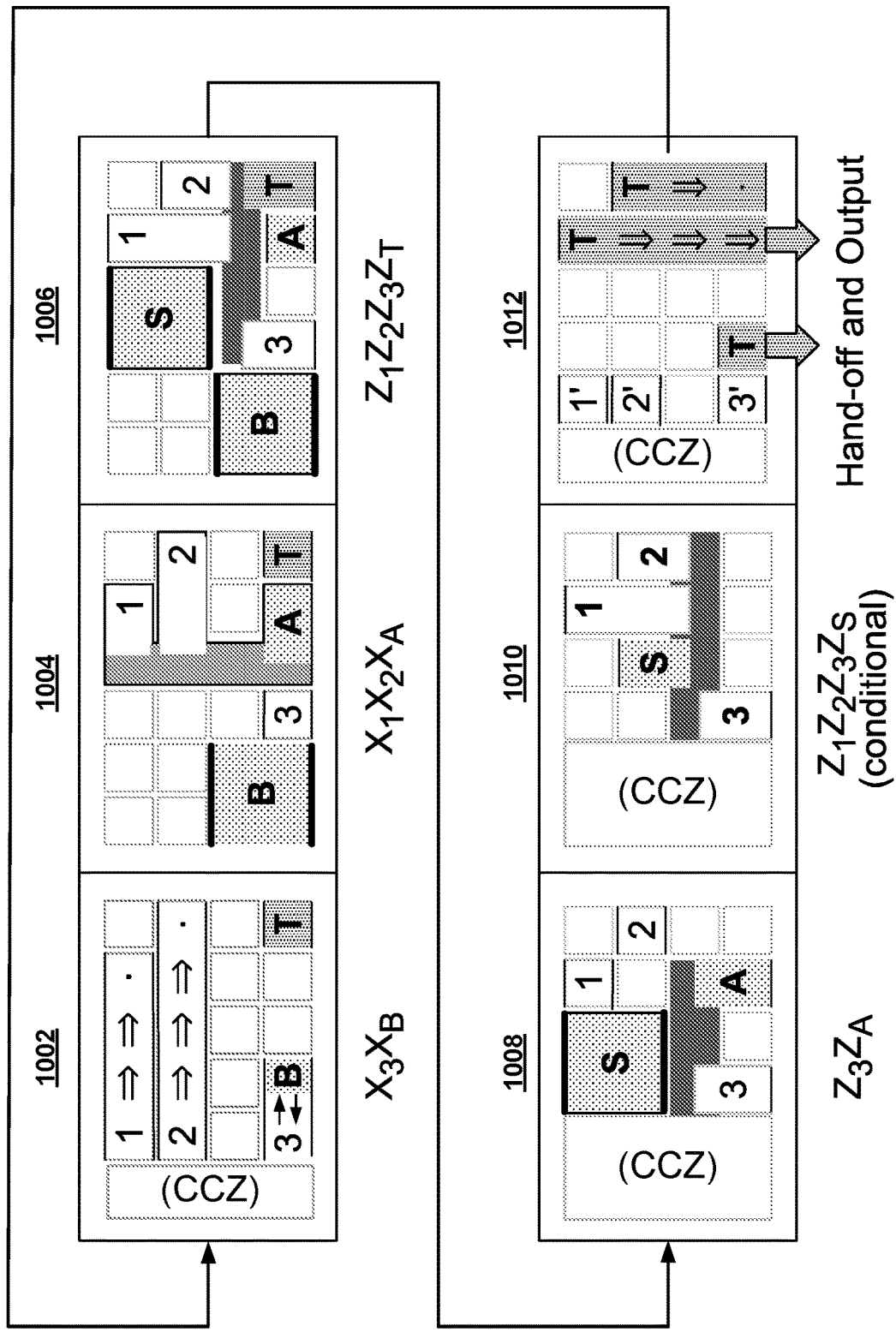
FIG. 10 shows example time slices of lattice surgery activity during production of three T states using the example quantum circuit of FIG. 9

The example quantum circuit 700 is compact but not in an ideal form for embedding into lattice surgery. FIGS. 8 and 9 show an equivalent circuit that can be translated into lattice surgery. The result of the translation is shown in FIG. 10, which shows example time slices of lattice surgery operations occurring as the factory operates.

FIG. 8 is a flow diagram of a second example process 800 for generating three T states using a CCZ state. For convenience, the process 800 will be described as being performed by a system of one or more classical and quantum computing devices located in one or more locations. For example, a quantum computation system, e.g., the system 100 of FIG. 1, appropriately programmed in accordance with this specification, can perform the process 800. In addition, for convenience the operations described below are described with reference to an ordered list of steps, however the order of some of the operations can change and different groups of operations can be performed in parallel.

The system obtains a qubit register (step 802). The qubit register includes a first target qubit, second target qubit and third target qubit prepared in a CCZ state. For example, the CCZ state may be a CCZ distilled using example process 200 of FIG. 2. The qubit register further includes a first ancilla qubit prepared in a T state. The qubit register further includes multiple additional ancilla qubits each prepared in a zero state, e.g., a second, third and fourth ancilla qubit each prepared in a zero state, The qubit register further includes multiple stabilizer qubits prepared in a zero state, e.g., a first, second, third, fourth and fifth stabilizer qubit each prepared in a zero state. An example qubit register is illustrated and described below with reference to FIG. 7.

The system performs an X gate on a target qubit and an additional ancilla qubit using a first stabilizer qubit as a control (step 804). For example, continuing the example above, the system may perform an X gate on the third target qubit using the first stabilizer qubit as a control and perform an X gate on the third ancilla qubit using the first stabilizer qubit as a control. In this description, when a stabilizer qubit is used as a control the control may be an X axis control that includes application of a Hadamard gate to the stabilizer qubit before and after the stabilizer qubit is used as a control.

The system then measures the first stabilizer qubit to determine a state of the first stabilizer qubit.

The system performs an X gate on multiple target qubits and an additional ancilla qubit using a second stabilizer qubit as a control (step 806). The system then measures the second stabilizer qubit to determine a state of the second stabilizer qubit. For example, continuing the example above, the system may perform an X gate on: the first target qubit using the second stabilizer qubit as a control, the second target qubit using the second stabilizer qubit as a control, and the fourth ancilla qubit using the second stabilizer qubit as a control. The system then measures the second stabilizer qubit to determine a state of the second stabilizer qubit.

The system performs an $X^{1/2}$ gate on an additional ancilla qubit (step 808). For example, the system may perform the $X^{1/2}$ gate on the third ancilla qubit;

The system performs a Z gate on each of multiple target qubits and on the first ancilla qubit using a third stabilizer qubit as a control for each Z gate (step 810). For example, continuing the example above, the system may perform a Z gate on the first, second and third target qubits and the first ancilla qubit using the third stabilizer qubit as a control in each case.

The system performs a Hadamard gate on the first ancilla qubit and measures the first ancilla qubit, an additional ancilla qubit, and a third stabilizer qubit to determine respective qubit states (step 812). For example, after performing the Hadamard gate the system may measure the first ancilla qubit, third ancilla qubit and third stabilizer qubit to determine respective states if the first ancilla qubit, third ancilla qubit and third stabilizer qubit.

The system performs an $X^{1/2}$ gate on an additional ancilla qubit (step 814). For example, the system may perform an $X^{1/2}$ gate on the second ancilla qubit.

The system performs a Z gate on a target qubit and an additional ancilla qubit using a fourth stabilizer qubit as a control for each Z gate (step 816). For example, the system may perform a Z gate on the third target qubit using the fourth stabilizer qubit as a control and perform a Z gate on the fourth ancilla qubit using the fourth stabilizer qubit as a control.

The system performs a Hadamard gate on an additional ancilla qubit and measures the additional ancilla qubit and the fourth stabilizer qubit to determine respective qubit states (step 818). For example, the system may perform a Hadamard gate on the fourth ancilla qubit and measure the fourth ancilla qubit and the fourth stabilizer qubit.

The system performs one NOT operation on a stabilizer qubit using an additional ancilla qubit as a control and performs two NOT operations on the additional ancilla qubit and the stabilizer qubit using a different stabilizer qubit as a control (step 820). For example, the system may perform a NOT operation on the third stabilizer qubit using the third ancilla qubit as a control, perform a NOT operation on the third stabilizer qubit using the first stabilizer qubit as a control, and perform a NOT operation on the third ancilla qubit using the first stabilizer qubit as a control.

The system performs a respective Z gate on multiple target qubits and an additional ancilla qubit using two stabilizer qubits as a control (step 822). For example, the system may perform a Z gate on each of the three target qubits and the second ancilla qubit using the third and fifth stabilizer qubits as a control.

The system performs a Hadamard gate on an additional ancilla qubit (step 824). For example, the system may perform a Hadamard operation on the second ancilla qubit. The system then measures the additional ancilla qubit, e.g., second ancilla qubit, and the fifth stabilizer qubit to determine respective qubit states.

The system performs multiple classically controlled Pauli operators on the three target qubits conditioned on the determined states of the ancilla qubits (step 826). Performing the multiple classically controlled Pauli operators on the three target qubits conditioned on the determined states of the ancilla qubits can reduce decoherence.

Performing multiple classically controlled Pauli operators on the three target qubits conditioned on the determined states of the ancilla qubits includes performing multiple Z gates on one or more of the target qubits using at least one of i) one or more stabilizer qubits and ii) one or more ancilla qubits as a control. For example, the system can perform a sequence of operations from a set of operations that includes: application of a Z gate on the first, second and third target qubits using the third and fifth stabilizer qubits as a control, application of a Z gate on the first, second and third target qubits using the third ancilla qubit and third stabilizer qubits as a control, application of a Z gate on the first, second and third target qubits using the second ancilla and third stabilizer qubits as a control, application of a Z gate on the third target qubit using the second stabilizer qubit as a control, application of a Z gate on the third target qubit using the fourth ancilla qubit as a control, application of a Z gate on the first, second and third target qubits using the first ancilla qubit as a control. The system can then perform X gates on one or more of the target qubits using a stabilizer qubit or ancilla qubit as a control, e.g., an X gate on the first and second target qubit using the fourth stabilizer qubit as a control, and an X gate on the first, second and third target qubit using the third ancilla qubit as a control, and perform an X gate on a target qubit, e.g., the third target qubit.

The system can provide the three target states, which after step 826 are each T states, for use in subsequent computations. For example, in some implementations the system may provide one or more of the T states as input to subsequent implementations of example process 800. The remaining T states may then be used in some subsequent computations being performed by the quantum computing device. In some cases the system may only provide output T states for use in subsequent computations or as input to a subsequent implementation of example process 800 if the output T states have not accumulated an amount of error higher than a predetermined acceptable threshold. If an output T state has accumulated an amount of error higher than the predetermined acceptable threshold the system may discard the state and/or provide a different T state to the subsequent computation/implementation, e.g., a stored T state.

FIG. 9 is a diagram of a second example quantum circuit 900 for generating three T states using a CCZ state. The example quantum circuit 900 operates on a register of qubits 902, where each qubit is represented by a respective horizontal lines. The register of qubits 902 includes three target qubits labelled 1, 2, and 3. The target qubits 1, 2, 3 are prepared in a CCZ state. The register of qubits 902 further includes a first ancilla qubit labelled T prepared in a T state. The register of qubits 902 further includes a second, third and fourth ancilla qubit labelled S, B, and A, respectively. The second, third and fourth ancilla qubits are each prepared in a zero state. The register of qubits 302 further includes five stabilizer qubits labelled $X_3X_B$, $X_{12}X_A$, $Z_{123}Z_T$, $Z_3Z_A$, $Z_{123}Z_S$. The five stabilizer qubits are each prepared in a zero state.

The example quantum circuit 900 includes multiple product-of-Paulis measurements 904-912. The first product-of-Paulis measurement 904 corresponds to step 804 of FIG. 8. The first product-of-Paulis measurement 904 includes a first X gate, e.g., X gate 918, applied to the third target qubit and a second X gate applied to the third ancilla qubit B. The first stabilizer qubit $X_3X_B$ acts as an X axis control for both X gates included in the first product-of-Paulis measurement 904. The first product-of-Paulis measurement 904 further includes a measurement operation applied to the first stabilizer qubit $X_3X_B$.

The second product-of-Paulis measurement 906 corresponds to step 806 of FIG. 8. The second product-of-Paulis measurement 906 includes a first X gate applied to the first target qubit, a second X gate applied to the second target qubit, and a third X gate applied to the fourth ancilla qubit A. The second stabilizer qubit $X_{12}X_A$ acts as an X axis control for each X gate included in the second product-of-Paulis measurement 906. The second product-of-Paulis measurement 906 further includes a measurement operation applied to the second stabilizer qubit $X_{12}X_A$.

After the second product-of-Paulis measurement 906, an $X^{1/2}$ gate 922 is applied to the third ancilla qubit B. The $X^{1/2}$ gate 922 corresponds to step 808 of FIG. 8.

The third product-of-Paulis measurement 908 corresponds to steps 810 and 812 of FIG. 8. The third product-of-Paulis measurement 908 includes a first Z gate, e.g., Z gate 924, applied to the first target qubit, a second Z gate applied to the second target qubit, a third Z gate applied to the third target qubit, and a fourth Z gate applied to the first ancilla qubit. The third stabilizer qubit $Z_{123}Z_T$ acts an X axis control for each Z gate included in the third product-of-Paulis measurement 908. The third product-of-Paulis measurement 908 further includes a Hadamard gate 926 and measurement operation that are applied to the first ancilla qubit T. The third product-of-Paulis measurement 908 further includes a measurement operation applied to the third ancilla qubit B and a measurement operation applied to the third stabilizer qubit $Z_{123}Z_T$.

After the third product-of-Paulis measurement 908, an $X^{1/2}$ gate 928 is applied to the second ancilla qubit S. The $X^{1/2}$ gate 928 corresponds to step 814 of FIG. 8.

The fourth product-of-Paulis measurement 910 corresponds to steps 816 and 818 of FIG. 8. The fourth product-of-Paulis measurement 910 includes a first Z gate applied to the third target qubit 3 and a second Z gate applied to the fourth ancilla qubit. The fourth stabilizer qubit $Z_3Z_A$ acts as an X axis control for each Z gate included in the fourth product-of-Paulis measurement 910. The fourth product-of-Paulis measurement 910 further includes a Hadamard gate and measurement operation that are applied to the fourth ancilla qubit A. The fourth product-of-Paulis measurement 910 further includes a measurement operation applied to the fourth stabilizer qubit $Z_3Z_A$.

After the fourth product-of-Paulis measurement 910, a first NOT operation, e.g., NOT operation 930, is performed on the third stabilizer qubit $Z_{123}Z_T$ using the third ancilla qubit B as a control. A second NOT operation is performed on the third stabilizer qubit $Z_{123}Z_T$ using the first stabilizer qubit $X_3X_B$ as a control, and a third NOT operation is performed on the third ancilla qubit B using the first stabilizer qubit $X_3X_B$ as a control. Application of the first and second NOT operations corresponds to step 820 of FIG. 8.

The fifth product-of-Paulis measurement 912 corresponds to steps 822 and 824 of FIG. 8. The fifth product-of-Paulis measurement 912 includes a first Z gate applied to the first target qubit 1, a second Z gate applied to the second target qubit 2, a third Z gate applied to the third target qubit 3, and a fourth Z gate applied to the second ancilla qubit S. The third stabilizer qubit $Z_{123}Z_T$ and fifth stabilizer qubit $Z_{123}Z_S$ acts as controls for the Z gates included in the fifth product-of-Paulis measurement 912. The fifth product-of-Paulis measurement 912 also includes a Hadamard gate applied to the second ancilla qubit S, a measurement operation applied to the second ancilla qubit S, and a measurement operation applied to the fifth stabilizer qubit $Z_{123}Z_S$.

The example quantum circuit 900 further includes a collection 914 of multiple classically controlled Pauli operators. The collection 914 of multiple classically controlled Pauli operators correspond to step 826 of FIG. 8.

The multiple classically controlled Pauli operators include application of a Z gate on the first, second and third target qubits 1-3 using the third $Z_{123}Z_T$ and fifth $Z_{123}Z_S$ stabilizer qubits as a control, application of a Z gate on the first, second and third target qubits 1-3 using the third ancilla qubit B and third stabilizer qubit $Z_{123}Z_T$ as a control, application of a Z gate on the first, second and third target qubits 1-3 using the second ancilla qubit S and third stabilizer qubit $Z_{123}Z_T$ as a control, application of a Z gate on the third target qubit 3 using the second stabilizer qubit $X_{12}X_A$ as a control, application of a Z gate on the third target qubit 3 using the fourth ancilla qubit A as a control, and application of a Z gate on the first, second and third target qubits 1-3 using the first ancilla qubit T as a control. The multiple classically controlled Pauli operators further include application of an X gate to the first and second target qubit 1,2 using the fourth stabilizer qubit $Z_3Z_A$ as a control, application of an X gate on the first, second and third qubits 1-3 using the third ancilla qubit B as a control, and application of an X gate on the third target qubit 3. The three target states 1, 2, 3 are then each output in a respective T state 316.

As described above, the operations included in the example quantum circuit 900 can be translated into lattice surgery operations. FIG. 10 shows example time slices 1000 of lattice surgery activity during production of three T states using example quantum circuit 900 of FIG. 9. Each time slice can be matched to a step from FIG. 9, and the qubit labels used in FIG. 10 correspond to the qubit labels used FIG. 9. Black and shaded bars correspond to stabilizer measurements. Ancilla qubits are shown in filled boxes. The code distance of the ancilla qubits is doubled when single-qubit Clifford operations are being applied, to ensure there is sufficient suppression of errors. The CCZ box will be used by the CCZ factory producing CCZ states to be transformed.

Time slice 1002 corresponds to the first product-of-Paulis measurement 904 of FIG. 9. Time slice 1004 corresponds to the second product-of-Paulis measurement 906 of FIG. 9. Time slice 1006 corresponds to the third product-of-Paulis measurement 908 of FIG. 9. Time slice 1008 corresponds to the fourth product-of-Paulis measurement 910 of FIG. 9. Time slice 1010 corresponds to the fifth product-of-Paulis measurement 912 of FIG. 9. Time slice 1012 corresponds to the collection 914 of multiple classically controlled Pauli operators in FIG. 9.

Operating the Hardware: Arbitrary-Angle Phase Catalysis

Figure 11:
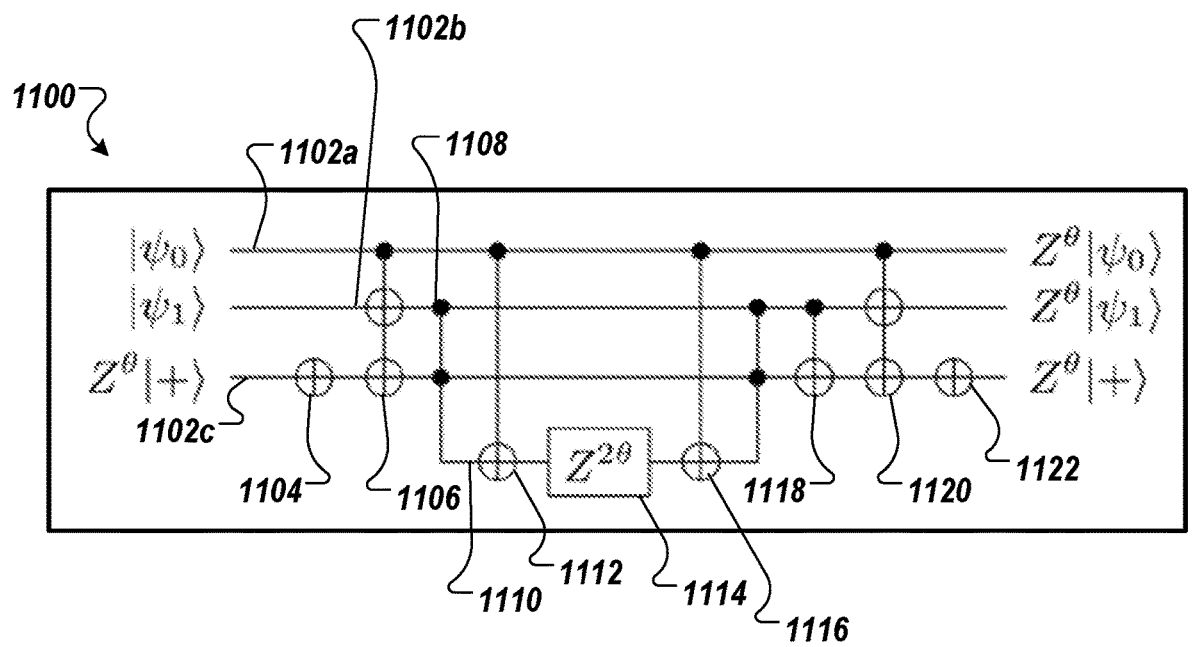
FIG. 11 is a diagram of an example generalized phase catalysis circuit for performing a target phase operation $Z^\theta$ on a first and second qubit using a third qubit prepared in a phased plus state $Z^\theta|+\rangle$.

The catalysis technique used in the C2T factory described herein can be generalized to phasing angles other than the T gate's 45°. FIG. 11, shows a generalization of FIG. 7 to arbitrary angles θ. FIG. 11 is a diagram of an example generalized phase catalysis quantum circuit 1100 for performing a target phase operation $Z^\theta$ on a first and second qubit using a third qubit prepared in a phased plus state $Z^\theta|+\rangle$. In example quantum circuit 1100, the first qubit, second qubit and third qubit are represented by horizontal lines 1102a-c. Qubits 1102a and 1102b represent the first and second qubit on which the target phase operation $Z^\theta$ is to be performed. Qubits 1102a and 1102b are provided to the example quantum circuit 1100 in input states $|\psi_0\rangle$ and $|\psi_1\rangle$, respectively. The input states $|\psi_0\rangle$ and $|\psi_1\rangle$ can be initial states of either of the qubits 1102a or 1102b, i.e., qubits 1102a or 1102b may have been prepared in arbitrary initial states, or can be states representing an output of a previous computation. Qubit 1102c represents the third qubit that is prepared in a phased plus state $Z^\theta|+\rangle$. The qubit 1102c can be prepared in the phased plus state using any one of existing techniques.

The example quantum circuit 1100 includes a sequence of gates that are applied to the qubits 1102a-1102c. The sequence of gates includes a first NOT operation 1104 that is applied to the third qubit 1102c. A first collection of operations are then applied to the qubits 1102a-1102c to compute a controlled adder operation on the qubits 1102a-1102c. The first collection of operations includes a multi target CNOT gate 1106 that is applied to the three qubits 1102a-1102c, where the first qubit acts as a control for the multi target CNOT gate. The first collection of operations further includes a logical AND operation 1108 that is performed between the second and third qubit. The result of the local AND operation is encoded in a fourth qubit 1110. The first collection of operations further includes a CNOT gate 1112 that is applied to the first qubit 302a and the fourth qubit 1110, where the first qubit 1102a acts as a control for the CNOT gate.

The sequence of gates further includes a square of the target phase operation 1114 that is applied to the fourth qubit 1110. A second collection of operations is then applied to the qubits 1102a-1102d to uncompute the controlled adder operation performed by the first collection of operations. The second collection of operations includes a CNOT operation 1116 that is applied to the first qubit 1102a and the fourth qubit 1110, where the first qubit 1102a acts as a control for the CNOT operation 1116. The second collection of operations further includes the uncomputation of a logical AND operation between the second qubit 1102b and the third qubit 1102c.

The sequence of gates further includes a CNOT operation 1118 that is applied to the second qubit 1102b and the third qubit 1102c, where the second qubit 1102b acts as a control for the CNOT operation 1112. The sequence of gates further includes a multi target CNOT operation 1120 that is applied to the first qubit 1102a, second qubit 1102b and third qubit 1102c, where the first qubit 1102a acts as a control for the multi target CNOT operation 1120. The sequence of gates includes a NOT operation 1122 that is applied to the third qubit 1102c. The NOT operation 1122 returns the qubit to the original phased plus state $Z^\theta|+\rangle$.

After the example quantum circuit has been applied to the three qubits 1102a-c (and fourth qubit 1110), the target phase operation $Z^\theta$ has been applied to the first qubit 1102a and second qubit 1102b. That is, the example quantum circuit 1100 operates on a resource state—a $|+\rangle$ state that has been phased by an angle equivalent to the target phase operation's angle—and two input states that are to be phased by the angle, phases the two inputs states in the target way, and returns the resource state.

Figure 12:
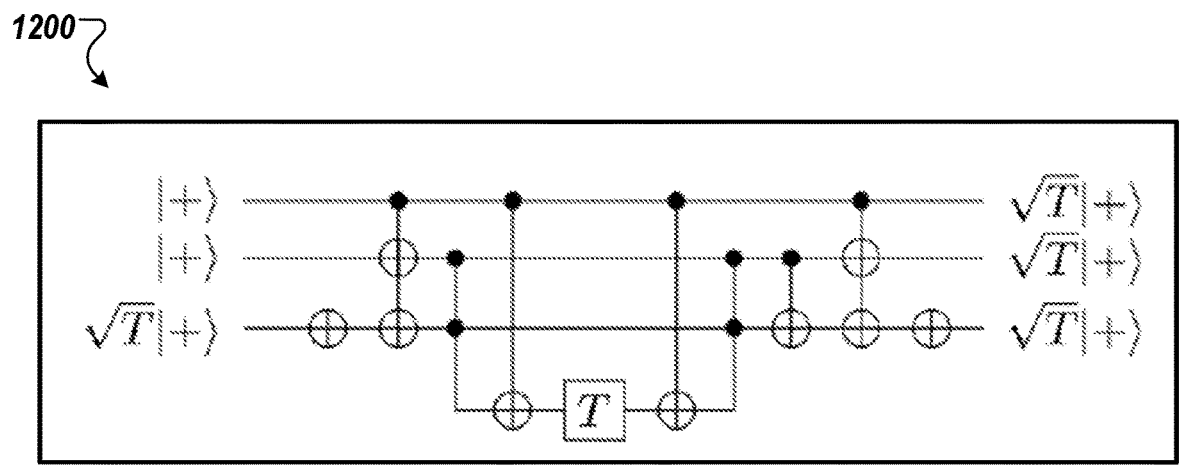
FIG. 12 is a diagram of an example quantum circuit for performing a NT gate on a first qubit prepared in a first input state and a second qubit prepared in a second input state using a third qubit prepared in a $\sqrt{T}|+\rangle$ state.

FIG. 12 is a diagram of an example quantum circuit 1200 that specializes the generalized phase catalysis circuit 1100 of FIG. 11 to θ=22.5°, i.e. to the $\sqrt{T}$ gate. This specialized circuit creates two $\sqrt{T}$ states by performing one Toffoli operation and one T gate. The example quantum circuit 1200 can produce $\sqrt{T}$ states with an order of magnitude less spacetime volume than previous techniques, assuming a physical gate error rate of $10^{-3}$ and a target error rate of $10^{-10}$. For example some repeat-until-success circuits use ≈45 T gates to perform a $\sqrt{T}$ gate at $\epsilon=10^{-10}$ and some methods that include direct synthesis of the V state uses ≈25 times more volume than direct synthesis of T states (though this ratio improves as the physical gate error rate improves).

Operating the Hardware: Example Methods Implemented by the $$8|T\rangle \xrightarrow{28\epsilon^2} 2|T\rangle$$

Factory

The CCZ factory described above with reference to FIGS. 2-5 can be combined with the C2T factory described above with reference to FIGS. 6-12, e.g., the example process 600 or 800 can be appended to example process 200. Combining the two factories/processes produces a T-catalyzed T factory that transforms eight noisy T states into two T states with quadratically less noise, thus achieving a 4:1 ratio of input T states to output T states. This is competitive with a 3:1 ratio of block code state distillation and particularly advantageous because conventionally a larger number of T states must be worked with in order to achieve such good ratios.

In some implementations the CCZ factory (or example process 200) may be modified when being combined with the T-catalyzed T factory (or example processes 600/800).

For example, some or all of the stabilizer measurements may be reordered and the output qubits may be positioned in a different location so that the CCZ factory fits tightly into the T catalyzed T factory. This means that some of the steps of example process 200 and 600 (or 800) can be combined and the ordering may change. In addition, the factory does not have to be interleaved with itself any more.

Figure 13:
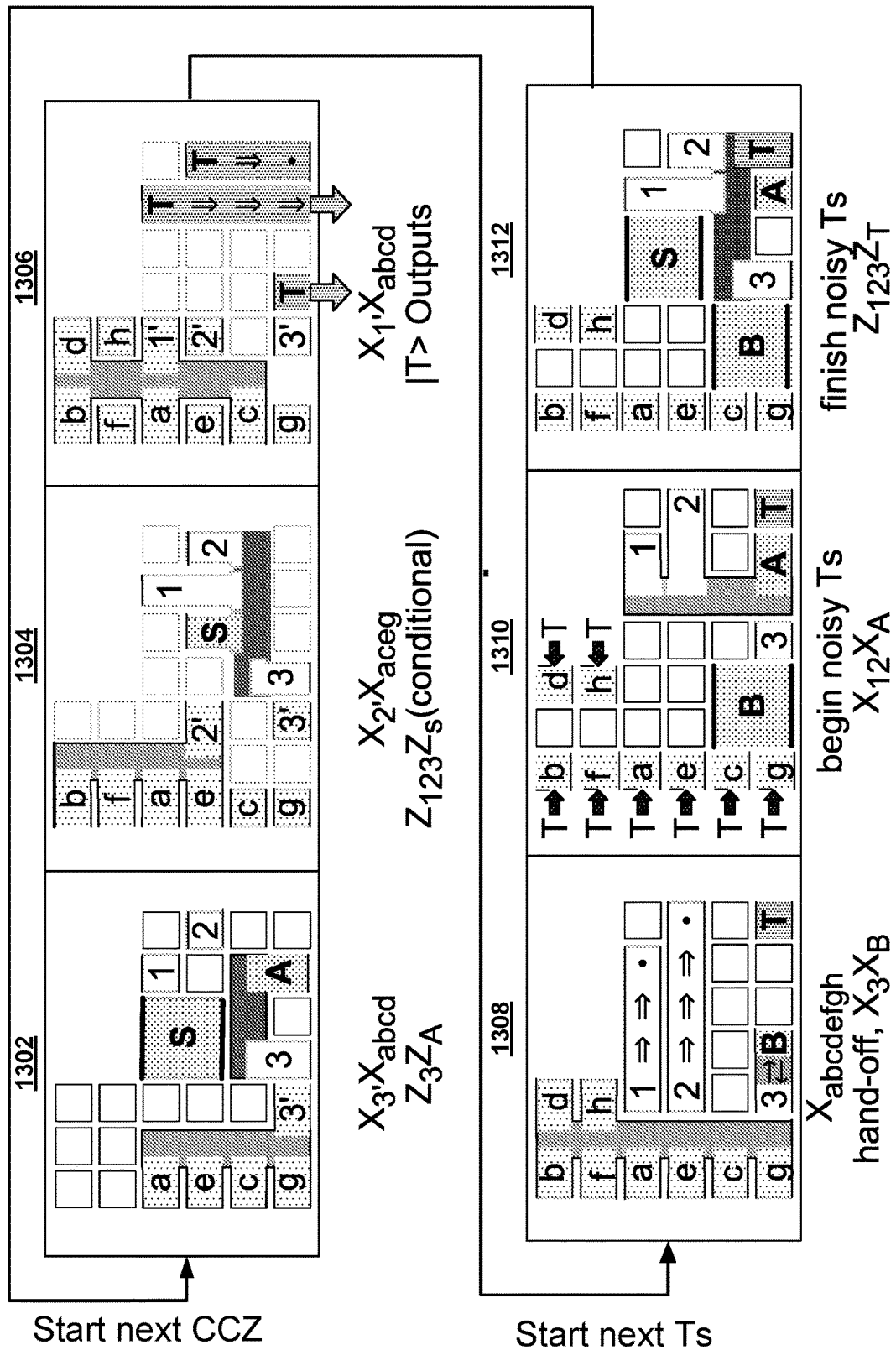
FIG. 13 shows example time slices of lattice surgery activity during a parallel operation of a T-catalyzed factory and a CCZ factory

FIG. 13 shows example time slices of lattice surgery activity during a combined operation of a T-catalyzed factory and a CCZ factory. Qubit labels can be matched up with FIG. 4 for verification that the correct stabilizers are being measured (though in a different order).

Time slice 1302 corresponds to time slice 400c of FIG. 4 and 1008 of FIG. 10. Time slice 1304 corresponds to time slice 400d of FIG. 4 and 1010 of FIG. 10. Time slice 1306 corresponds to time slice 400a of FIG. 4 and 1012 of FIG. 10. Time slice 1308 corresponds to time slice 400b of FIG. 4 and 1002 of FIG. 10. Time slice 1310 corresponds to time slices 400d and 400e of FIG. 4 and time slice 1004 of FIG. 10. Time slice 1312 corresponds to time slices 400e-h of FIG. 4 and time slice 1006 of FIG. 10.

Figure 14:
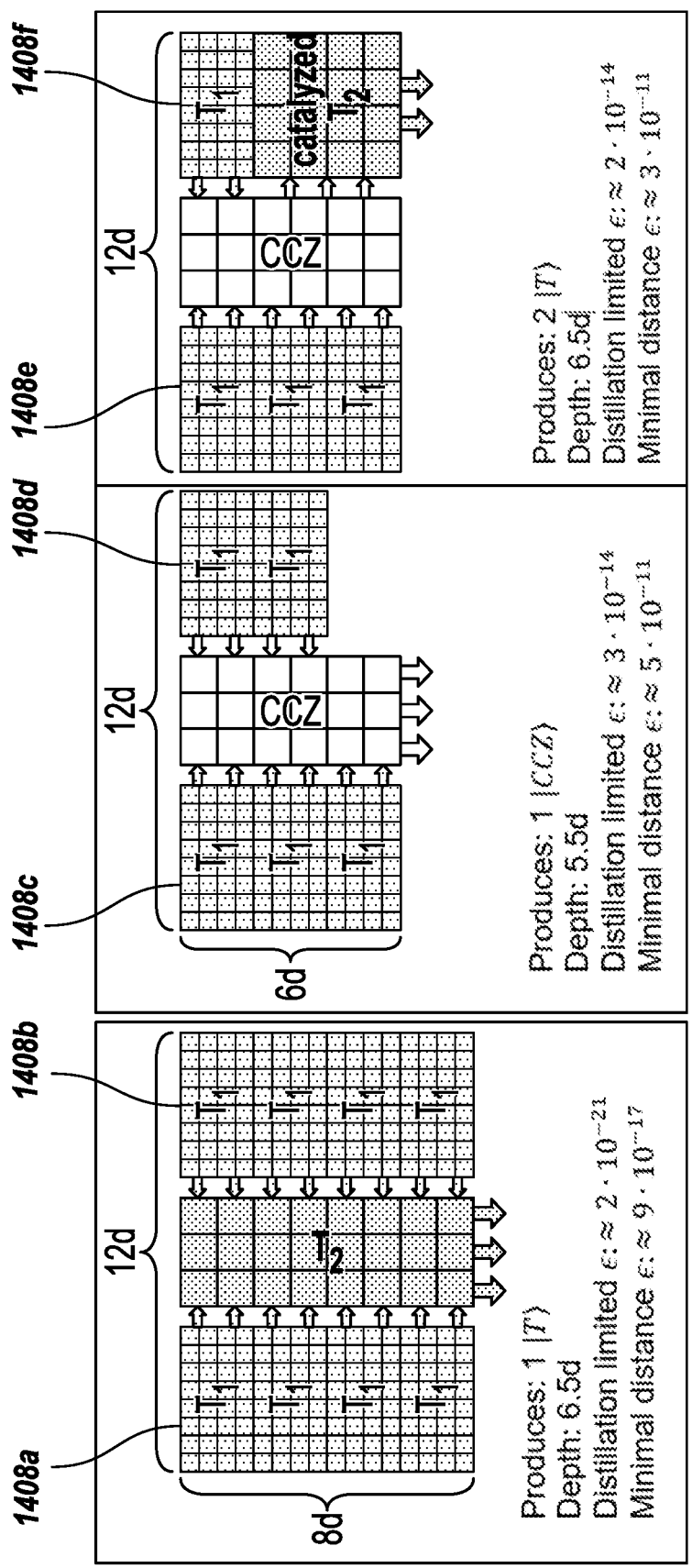
FIG. 14 is a diagram of the spatial layout and data flow of a known T factory construction, the presently described CCZ factory construction, and the presently described T-catalyzed T factory.

FIG. 14 is a diagram of the spatial layout and data flow of a known $$15|T\rangle \xrightarrow{35\epsilon^3} |T\rangle$$

factory construction 1402, the presently described $$8|T\rangle \xrightarrow{28\epsilon^2} |CCZ\rangle$$

factory construction 1404, and the presently described $$|T\rangle\text{-catalyzed } 8|T\rangle \xrightarrow{28\epsilon^2} 2|T\rangle$$

factory 1406. The displayed error rates assume a physical gate error rate of $10^{-3}$ and assume that the code distance is large enough for the dominant source of error in the outputs to be distillation error. The level-1 T factories 1408a-f are performed at half code distance to balance the contributions from distillation error and code error. FIG. 14 shows how the presently described CCZ factory and T-catalyzed T factory constructions have smaller footprints, faster output, and an amount of suppression sufficient to run proposed algorithms beyond the classical simulation regime.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

Elements of a digital and/or quantum computer include a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for distilling a CCZ state, the method comprising:
    preparing a register of qubits in a zero state, the register comprising a plurality of target qubits, a plurality of ancilla qubits and a plurality of stabilizer qubits;
    performing, for each stabilizer qubit, an X gate on i) multiple ancilla qubits, or ii) multiple ancilla qubits and one of the target qubits using the stabilizer qubit as a control;
    measuring the stabilizer qubits to determine respective stabilizer qubit states;
    performing, on each of the ancilla qubits, a $Z^{1/4}$ quantum gate and a Hadamard quantum gate;
    measuring each of the ancilla qubits to determine respective ancilla qubit states;
    performing, conditioned on each determined ancilla qubit state, i) a NOT operation on a selected stabilizer qubit, or ii) a NOT operation on the selected stabilizer qubit and a Z gate on one or more respective target qubits;
    performing, on each target qubit and conditioned on a determined state of a respective stabilizer qubit, a Z gate on the target qubit; and
    performing an X gate on each of the target qubits to obtain the CCZ state.

2. The method of claim 1, wherein the plurality of target qubits comprises three target qubits, the plurality of ancilla qubits comprises eight ancilla qubits and the plurality of stabilizer qubits comprises four stabilizer qubits.

3. The method of claim 2, wherein performing, for each stabilizer qubit, an X gate on i) multiple ancilla qubits, or ii) multiple ancilla qubits and one of the target qubits using the stabilizer qubit as a control, and measuring the stabilizer qubits to determine respective stabilizer qubit states comprises performing a sequence of operations from a first set of operations, the first set of operations comprising:
    performing an X gate on a first target qubit using a first stabilizer qubit as a control;
    performing an X gate on a first, second, third and fourth ancilla qubit using the first stabilizer qubit as a control;
    performing an X gate on the first, the second, the third, the fourth, a fifth, a sixth, a seventh and an eighth ancilla qubits using a second stabilizer qubit as a control;
    performing an X gate on a third target qubit using a third stabilizer qubit as a control;
    performing an X gate on the first, the second, the fifth and the seventh ancilla qubits using the third stabilizer qubit as a control;
    performing an X gate on a second target qubit using a fourth stabilizer qubit as a control;
    performing an X gate on the first, second, fifth and sixth ancilla qubits using the fourth stabilizer qubit as a control;
    measuring the first stabilizer qubit;
    measuring the second stabilizer qubit;
    measuring the third stabilizer qubit; and
    measuring the fourth stabilizer qubit.

4. The method of claim 2, wherein performing, for each ancilla qubit and conditioned on a determined state of the respective ancilla qubit, i) a NOT operation on the second stabilizer qubit, or ii) a NOT operation on the second stabilizer qubit and a Z gate on one or more target qubits comprises performing a sequence of operations from a second set of operations, the second set of operations comprising:
    performing, conditioned on the state of the first ancilla qubit, a Z gate on each of the three target qubits and a NOT operation on the second stabilizer qubit;
    performing, conditioned on the state of the second ancilla qubit, a Z gate on the first and the second target qubits and a NOT operation on the second stabilizer qubit;
    performing, conditioned on the state of the third ancilla qubit, a Z gate on the first and the third target qubits and a NOT operation on the second stabilizer qubit;
    performing, conditioned on the state of the fourth ancilla qubit, a Z gate on the first target qubit and a NOT operation on the second stabilizer qubit;
    performing, conditioned on the state of the fifth ancilla qubit, a Z gate on the second and the third target qubits and a NOT operation on the second stabilizer qubit;
    performing, conditioned on the state of the sixth ancilla qubit, a Z gate on the second target qubit and a NOT operation on the second stabilizer qubit;
    performing, conditioned on the state of the seventh ancilla qubit, a Z gate on the third target qubit and a NOT operation on the second stabilizer qubit; and
    performing, conditioned on the state of the eighth ancilla qubit, a NOT operation on the second stabilizer qubit.

5. The method of claim 2, wherein performing, for each target qubit and conditioned on a determined state of a stabilizer qubit, a Z gate on the target qubit comprises:
    performing, conditioned on the state of the first stabilizer qubit, a Z gate on the first target qubit;
    performing, conditioned on the state of the third stabilizer qubit, a Z gate on the third target qubit; and
    performing, conditioned on the state of the fourth stabilizer qubit, a Z gate on the second target qubit.

6. The method of claim 1, wherein performing, for each stabilizer qubit, an X gate on i) multiple ancilla qubits, or ii) multiple ancilla qubits and one of the target qubits using the stabilizer qubit as a control comprises using the stabilizer qubit as an X axis control by applying a Hadamard gate to the stabilizer qubit before and after the stabilizer qubit is used as a control.

7. The method of claim 1, wherein measuring the stabilizer qubits comprises performing Pauli product measurements on the stabilizer qubits.

8. The method of claim 1, the method further comprising performing a post selection operation, comprising:
    determining whether an error occurred or not using a parity computation; and
    in response to determining that an error occurred, discarding the obtained CCZ state.

9. The method of claim 8, wherein the parity computation is performed on the selected stabilizer qubit.

10. The method of claim 8, wherein using a post selection operation comprises implementing classical control software.

11. The method of claim 1, wherein the method is implemented using lattice surgery techniques.

12. The method of claim 11, wherein the method is implemented to distill a first CCZ state and the method further comprises concurrently distilling a second CCZ state by partially overlapping executions of operations corresponding to the distillation of the first CCZ state and the distillation of the second CCZ state.

13. The method of claim 12, wherein executions of operations corresponding to distillation of the first CCZ state and distillation of the second CCZ state are reordered prior to the overlapping.

14. The method of claim 1, further comprising providing the CCZ state for use in subsequent computations.

15. A quantum computing device comprising:
a register of qubits comprising multiple target qubits, multiple ancilla qubits, and multiple stabilizer qubits each prepared in a respective initial state;
a plurality of control lines coupled to the register of qubits;
a plurality of control devices coupled to the plurality of control lines; and
one or more classical processors;
wherein the quantum computing device is configured to:
prepare a register of qubits in a zero state, the register comprising a plurality of target qubits, a plurality of ancilla qubits and a plurality of stabilizer qubits;
perform, for each stabilizer qubit, an X gate on i) multiple ancilla qubits, or ii) multiple ancilla qubits and one of the target qubits using the stabilizer qubit as a control;
measure the stabilizer qubits to determine respective stabilizer qubit states;
performing, on each of the ancilla qubits, a $Z^{1/4}$ quantum gate and a Hadamard quantum gate;
measure each of the ancilla qubits to determine respective ancilla qubit states;
perform, conditioned on each determined ancilla qubit state, i) a NOT operation on a selected stabilizer qubit, or ii) a NOT operation on the selected stabilizer qubit and a Z gate on one or more respective target qubits;
perform, on each target qubit and conditioned on a determined state of a respective stabilizer qubit, a Z gate on the target qubit; and
perform an X gate on each of the target qubits to obtain the CCZ state.

16. The quantum computing device of claim 15, wherein the quantum computing device comprises a CCZ state factory.

17. A method for transforming a CCZ state into three output T states, the method comprising:
obtaining i) three target qubits prepared in a CCZ state, ii) a first ancilla qubit in a T state, iii) a multiple additional ancilla qubits prepared in a zero state, and iv) multiple stabilizer qubits prepared in a zero state;
performing an X gate on a target qubit and an additional ancilla qubit using a first stabilizer qubit as a control and measuring the first stabilizer qubit to determine a state of the first stabilizer qubit;
performing an X gate on multiple target qubits and an additional ancilla qubit using a second stabilizer qubit as a control and measuring the second stabilizer qubit to determine a state of the second stabilizer qubit;
performing a $X^{1/2}$ gate on an additional ancilla qubit;
performing a Z gate on multiple target qubits and the first ancilla qubit using a third stabilizer qubit as a control;
performing a Hadamard gate on the first ancilla qubit and measuring the first ancilla qubit, an additional ancilla qubit and a third stabilizer qubit to determine respective qubit states;
performing a $X^{1/2}$ gate on an additional ancilla qubit;
performing a Z gate on a target qubit and an additional ancilla qubit using a fourth stabilizer qubit as a control;
performing a Hadamard gate on an additional ancilla qubit and measuring the additional ancilla qubit and the fourth stabilizer qubit to determine respective qubit states;
performing a NOT operation on a stabilizer qubit using an additional ancilla qubit as a control, and two NOT operations on the additional ancilla qubit and the stabilizer qubit using a different stabilizer qubit as a control;
performing a Z gate on multiple target qubits and an additional ancilla qubit using two stabilizer qubits as a control;
performing a Hadamard gate on an additional ancilla qubit and measuring the additional ancilla qubit and a stabilizer qubit to determine respective qubit states; and
performing multiple classically controlled Pauli operators on the three target qubits conditioned on the determined states of the ancilla qubits.

18. The method of claim 17, wherein the three target qubits comprise a first, second and third target qubit, the multiple additional ancilla qubits comprise a second, third and fourth ancilla qubit, and the multiple stabilizer qubits comprise a first, second, third, fourth and fifth stabilizer qubit.

19. The method of claim 18, wherein performing an X gate on a target qubit and an additional ancilla qubit using a first stabilizer qubit as a control comprises:
performing an X gate on the third target qubit using the first stabilizer qubit as a control; and
performing an X gate on a third ancilla qubit using the first stabilizer qubit as a control.

20. The method of claim 19, wherein performing a $X^{1/2}$ gate on an additional ancilla qubit comprises performing a $X^{1/2}$ gate on the third ancilla qubit.

* * * * *